United States Patent
Xu et al.

(10) Patent No.: US 12,284,350 B2
(45) Date of Patent: Apr. 22, 2025

(54) METHOD AND APPARATUS FOR PROCESSING IMAGE SIGNAL CONVERSION, AND TERMINAL DEVICE

(71) Applicant: HUAWEI TECHNOLOGIES CO., LTD., Shenzhen (CN)

(72) Inventors: Weiwei Xu, Hangzhou (CN); Quanhe Yu, Beijing (CN); Hu Chen, Munich (DE); Elena Alexandrovna Alshina, Munich (DE); Rafal Mantiuk, Cambridge (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 95 days.

(21) Appl. No.: 17/721,561

(22) Filed: Apr. 15, 2022

(65) Prior Publication Data
US 2022/0256157 A1  Aug. 11, 2022

Related U.S. Application Data

(63) Continuation of application No. PCT/CN2020/114136, filed on Sep. 9, 2020.

(30) Foreign Application Priority Data

Oct. 18, 2019 (CN) .......................... 201910999368.6

(51) Int. Cl.
*H04N 19/126* (2014.01)
*H04N 19/136* (2014.01)
(Continued)

(52) U.S. Cl.
CPC ......... *H04N 19/126* (2014.11); *H04N 19/136* (2014.11); *H04N 19/172* (2014.11); *H04N 19/186* (2014.11); *H04N 19/189* (2014.11)

(58) Field of Classification Search
None
See application file for complete search history.

(56) References Cited

U.S. PATENT DOCUMENTS

2005/0243176 A1  11/2005 Wu et al.
2007/0172145 A1  7/2007 Altunbasak et al.
(Continued)

FOREIGN PATENT DOCUMENTS

CN  1954339 A  4/2007
CN  101707666 A  5/2010
(Continued)

OTHER PUBLICATIONS

Zhu Enhong et al., "Method of Generating High Dynamic Range Image from a Single Image", Journal of Computer-Aided Design & Computer Graphics, vol. 28, No. 10, Oct. 2016;10 pages.

*Primary Examiner* — Samuel D Fereja
(74) *Attorney, Agent, or Firm* — Rimon PC

(57) ABSTRACT

Embodiments of this application provide a method for processing image signal conversion, including: obtaining a primary color component of a to-be-processed pixel; and converting a first value of the primary color component into a second value based on a preset dynamic range conversion model, where the dynamic range conversion model is:

$$L' = F(L) = a \times \left( \frac{p \times L^n}{(k_1 \times p - k_2) \times L^n + k_3} \right)^m + b,$$

where
L is the first value, L' is the second value, and $k_1$, $k_2$, $k_3$, a, b, m, n, and p are model parameters.

17 Claims, 8 Drawing Sheets

(51) Int. Cl.
*H04N 19/172* (2014.01)
*H04N 19/186* (2014.01)
*H04N 19/189* (2014.01)

(56) References Cited

U.S. PATENT DOCUMENTS

| | | |
|---|---|---|
| 2009/0027558 A1 | 1/2009 | Mantiuk et al. |
| 2009/0310015 A1 | 12/2009 | El-Mahdy et al. |
| 2017/0064334 A1 | 3/2017 | Minoo |
| 2017/0180759 A1 | 6/2017 | Mertens |
| 2019/0188837 A1* | 6/2019 | Li ............................ G09G 5/00 |
| 2022/0279195 A1* | 9/2022 | Minoo ................. H04N 19/126 |

FOREIGN PATENT DOCUMENTS

| | | | |
|---|---|---|---|
| CN | 101854557 A | 10/2010 | |
| CN | 103621084 A | 3/2014 | |
| CN | 103747225 A | 4/2014 | |
| CN | 105009580 A | 10/2015 | |
| CN | 105144231 A | 12/2015 | |
| CN | 105550983 A | 5/2016 | |
| CN | 105750983 A | 7/2016 | |
| CN | 105850129 A | 8/2016 | |
| CN | 105869112 A | 8/2016 | |
| CN | 108024104 A | 5/2018 | |
| CN | 110097493 A | 8/2019 | |
| CN | 114467298 B | 4/2023 | |
| IN | 101212545 A | 7/2008 | |
| WO | 2018035696 A1 | 3/2018 | |
| WO | WO-2018035879 A1 * | 3/2018 | ............. G06T 5/009 |

\* cited by examiner

CONT. FROM FIG. 2A

CONT. FROM FIG. 2A

S207. Decode the encoded image information, to obtain decoded image information

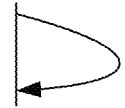

S208. Perform upsampling on the decoded image information, to obtain image information generated after upsampling

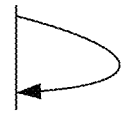

S209. Perform fixed-point-to-floating-point conversion on the image information generated after upsampling, to obtain image information generated after fixed-point-to-floating-point conversion

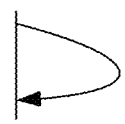

S210. Transfer, from the YCbCr space to the RGB space by using a preset second color space transfer function, the image information generated after fixed-point-to-floating-point conversion, to obtain image information generated after space transfer

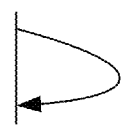

S211. Perform, by using a preset electro-optical transfer function, electro-optical transfer on the image information generated after space transfer, to obtain an output primary color signal

S212. Output the primary color signal

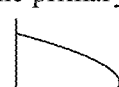

FIG. 2B

METHOD AND APPARATUS FOR PROCESSING IMAGE SIGNAL CONVERSION, AND TERMINAL DEVICE

CROSS-REFERENCE TO RELATED APPLICATIONS

This application is a continuation of International Application No. PCT/CN2020/114136, filed on Sep. 9, 2020, which claims priority to Chinese Patent Application No. 201910999368.6, filed on Oct. 18, 2019. The disclosures of the aforementioned applications are hereby incorporated by reference in their entireties.

TECHNICAL FIELD

The present invention relates to the field of image processing technologies, and in particular, to a method and an apparatus for processing image signal conversion, and a terminal device.

BACKGROUND

In a digital image, the dynamic range is a span of a maximum grayscale value to a minimum grayscale value in a range in which the image can be displayed. For a natural scene in the real world, if luminance ranges from 10-3 nits to 104 nits, a dynamic range of the real world may reach $10^7$, and is referred to as a high dynamic range (HDR). Currently, in most color digital images, each of the R, G, and B channels separately uses one 8-bit byte for storage. In other words, a representation range of each channel is a 0 to 255 gray scale. That is, a dynamic range of a color digital image is 0 to 255, and is referred to as a low dynamic range (LDR). An imaging process of a digital camera is actually mapping from the high dynamic range of the real world to the low dynamic range of the image.

A typical HDR video processing process includes: pre-processing, encoding, decoding, and post-processing. An HDR video is input, and undergoes processing performed by an optical-electro transfer function, color space transfer, floating-point-to-fixed-point conversion, 4:4:4-to-4:2:0 downsampling, and encoding performed by a 4:2:0 encoder, and a bitstream is obtained. The bitstream undergoes decoding performed by a 4:2:0 decoder, 4:2:0-to-4:4:4 upsampling, fixed-point-to-floating-point conversion, color space transfer, and processing performed by an electro-optical transfer function, and a finally output HDR video is obtained. A transfer function is used to perform non-linear transfer on an HDR source. The HDR video finally needs to be quantized to data that has an integral number of bits, and then is encoded. Considering that a dynamic range of the HDR video is far greater than a dynamic range of the data that has an integral number of bits, if linear quantization is directly performed, information about the HDR source is severely damaged. Therefore, the transfer function is mainly used to protect, through the non-linear transfer, a luminance segment that requires key protection.

A primary color signal is an optical signal in the real world, may be represented by "L" or "E", usually records a numeric value that is corresponding to a specific color component (for example, R, G, B, or Y), and is generally proportional to light intensity. A primary color signal of the image may be expressed in real luminance (for example, 10000 nits), or may be expressed in normalized luminance, for example, on the basis that maximum luminance of 10000 nits is normalized to a maximum luminance of 1. Processed image information obtained after the primary color signal undergoes conversion processing is a numeric expression value of the image, and a value of the processed image information is normalized to [0, 1]. The value of the processed image information may be represented by "L'" or "E'", and is usually used to represent a non-linear color value. Optical-electro transfer is performed on the primary color signal (normalized to [0, 1]) by using the optical-electro transfer function, to obtain processed image information. The processed image information obtained through the transfer performed by the optical-electro transfer function may include primary colors such as R, G, B, and Y Electro-optical transfer is performed on input image information by using the electro-optical transfer function, to obtain an output primary color signal. The processed output primary color signal is a restored optical signal in the real world. The optical-electro transfer function OETF (optical-electro transfer function) is sometimes referred to as an optical-electro transfer function or an optical-electro transfer curve. The electro-optical transfer function EOTF (electro-optical transfer function) is sometimes referred to as an electro-optical transfer function or an electro-optical transfer curve. The floating-point-to-fixed-point conversion is sometimes referred to as quantization, and the fixed-point-to-floating-point conversion is sometimes referred to as dequantization. An optical-electro transfer function in a conventional technology is proposed based on a luminance perception model of a human eye. The optical-electro transfer function may be as follows:

$R' = $ PQ_TF (max(0, min($R$/10000, 1)));

$G' = $ PQ_TF (max(0, min($G$/10000, 1)));

$B' = $ PQ_TF (max(0, min($B$/10000, 1))); and $$\text{PQ\_TF}(L) = \left(\frac{c_1 + c_2 L^{m_1}}{1 + c_3 L^{m_1}}\right)^{m_2}, \text{ where } m_1 = 0.1593017578125,$$

$m_2 = 78.84375$, $c_1 = 0.8359375$, $c_2 = 18.8515625$, and $c_3 = 18.6875$.

SUMMARY

This application provides a method and an apparatus for processing image signal conversion, and a terminal device, to improve a quality of mutual conversion between images in different dynamic ranges, to better adapt to a display device and obtain a displayed image of better quality.

A first aspect of this application provides a method for processing image signal conversion. The method includes: obtaining a primary color component of a to-be-processed pixel; and converting a first value of the primary color component into a second value based on a preset dynamic range conversion model, where the dynamic range conversion model is as follows:

$$L' = F(L) = a \times \left(\frac{p \times L^n}{(k_1 \times p - k_2) \times L^n + k_3}\right)^m + b,$$

where

L is the first value, L' is the second value, and $k_1$, $k_2$, $k_3$, a, b, m, n, and p are model parameters. In a feasible implementation, the model parameter is a rational number.

This embodiment of this application provides a new dynamic range conversion model, so that a higher degree of freedom can be provided for matching richer image content. The model parameter is properly configured, so that the quality of image dynamic range conversion can be improved.

In a feasible implementation, before the converting a first value of the primary color component into a second value based on a preset dynamic range conversion model, the method further includes: determining a method of obtaining the model parameter based on identifier information carried in metadata, where the metadata includes static metadata and/or dynamic metadata.

This embodiment of this application provides a plurality of methods for obtaining the model parameter, and a display end that learns the plurality of methods for obtaining the model parameter by using the identifier information in the metadata, thereby providing a plurality of choices between different implementation complexities and effects.

In a feasible implementation, the metadata and the to-be-processed pixel are obtained by decoding a bitstream related to a source image signal.

In a feasible implementation, the method of obtaining the model parameter includes: obtaining, through decoding, a value of the model parameter and is carried in the metadata; using a preset value as a value of the model parameter; or obtaining a value of the model parameter through calculation based on information about the source image signal and/or information about a display device, where the information about the source image signal is obtained by decoding the metadata.

For example, this embodiment of this application provides three possible methods of obtaining the model parameter. It should be understood that respective values of a plurality of model parameters may be obtained in different ways, that is, different model parameters in one group of model parameters represented by a same identifier may be obtained in a same way or different ways.

In a feasible implementation, at least one of $k_1$, $k_2$, $k_3$, a, b, m, n, and p is obtained by obtaining, through decoding, the value that is of the model parameter and that is carried in the metadata.

It should be understood that an implementation in which all values of the model parameters are carried in the metadata is simple, and also has a higher reliability when a video content generation end learns a parameter of the display device.

In a feasible implementation, at least one of $k_1$, $k_2$, $k_3$, m, and n is obtained based on the preset value, where $0 < n \leq 8$, and $0 < m \leq 8$.

In a feasible implementation, $k_1$ is 1. In a feasible implementation, $k_2$ is 1. In a feasible implementation, $k_3$ is 1. In a feasible implementation, m is 2.4 or 1. In a feasible implementation, n is 1 or $5/12$.

It should be understood that an implementation of obtaining the model parameter by using a preset value is the simplest, and no additional information needs to be transmitted. For example, this embodiment of this application provides values of $k_1$, $k_2$, $k_3$, m, and n.

In a feasible implementation, b is a minimum luminance value that is of the display device and that is obtained after normalization processing.

In a feasible implementation, $k_3$ is a maximum luminance value that is of pixels in a to-be-processed frame of the source image signal and that is obtained after normalization processing.

In a feasible implementation, the maximum luminance value of the pixels in the to-be-processed frame of the source image signal includes: a maximum value in luminance components of the pixels in the to-be-processed frame; or a maximum value in maximum primary color components of the pixels in the to-be-processed frame, where the maximum primary color component is a primary color component with a maximum value in a plurality of primary color components of one pixel.

In a feasible implementation, at least one of $k_1$, $k_2$, $k_3$, a, b, m, n, and p is obtained through calculation based on the information about the source image signal and/or the information about the display device.

In this embodiment of this application, the model parameter is obtained by using an attribute of the source image signal or the display device, so that performed dynamic range conversion processing better conforms to a feature of an actual application, and achieves a better effect. For example, the following provides several specific implementations.

In a feasible implementation, the information about the source image signal includes an average luminance value of the pixels in the to-be-processed frame of the source image signal, and p is obtained according to the following formula:

$$p = \begin{cases} p_{valueH} & avgL > TPH \\ p_{valueH} \times g\left(\frac{avgL-TPL}{TPH-TPL}\right) + p_{valueL} \times \left(1-g\left(\frac{avgL-TPL}{TPH-TPL}\right)\right) & avgL \geq TPL,\ avgL \leq TPH, \\ p_{valueL} & avgL < TPL \end{cases}$$

where avgL is an average luminance value that is of the pixels in the to-be-processed frame of the source image signal and that is obtained after normalization processing, TPH, TPL, $p_{valueH}$, and $p_{valueL}$ are all preset values, $0 \leq TPL$, $TPH \leq 1$, and go is a monotonically increasing function in an interval from 0 to 1.

In a feasible implementation, TPL is 0.5, TPH is 0.8, $p_{valueL}$ is 3.5, $p_{valueH}$ is 5.0, and $g(x)=x$, where x is a rational number in the interval from 0 to 1.

In a feasible implementation, the average luminance value of the pixels in the to-be-processed frame of the source image signal includes: an average value of the luminance components of the pixels in the to-be-processed frame; or an average value of the maximum primary color components of the pixels in the to-be-processed frame.

In a feasible implementation, the information about the source image signal includes the maximum luminance value of the pixels in the to-be-processed frame of the source image signal and a minimum luminance value of the pixels in the to-be-processed frame of the source image signal, and a is obtained according to the following formula:

$a=(\text{MaxDisplay}-\text{MinDisplay})/(H(\text{MaxSource})-H(\text{MinSource}))$, where MaxSource is the maximum luminance value that is of the pixels in the to-be-processed frame of the source image signal and that is obtained after the normalization processing, MinSource is a minimum luminance value that is of the pixels in the to-be-processed frame of the source image signal and that is obtained after normalization processing, MaxDisplay is a maximum luminance value that is of the display device and that is obtained after normalization processing, MinDisplay is the minimum luminance value that is of the display device and that is obtained after the normalization processing, and $$H(L) = \left(\frac{p \times L^n}{(k_1 \times p - k_2) \times L^n + k_3}\right)^m.$$

In a feasible implementation, the minimum luminance value of the pixels in the to-be-processed frame of the source image signal includes: a minimum value in the luminance components of the pixels in the to-be-processed frame; or a minimum value in the maximum primary color components of the pixels in the to-be-processed frame.

In a feasible implementation, a, p, and m are obtained by solving the following system of equations:

$$\begin{cases} a \times \left( \dfrac{p \times L1}{(p-1) \times L1 + 1} \right)^m + b = F1 \\ a \times \left( \dfrac{p \times L2}{(p-1) \times L2 + 1} \right)^m + b = F2, \\ a \times \left( \dfrac{p \times L3}{(p-1) \times L3 + 1} \right)^m + b = F3 \end{cases}$$

where

F1 is a value that is of 1 nit and that is obtained after normalization processing, F2 is a mapped value that is of the source image signal to the display device and that is obtained after normalization processing, F3 is the maximum luminance value that is of the display device and that is obtained after the normalization processing, L1 is a perceived luminance value that is of the source image signal and that is obtained after normalization processing, L2 is the average luminance value that is of the pixels in the to-be-processed frame of the source image signal and that is obtained after the normalization processing, and L3 is the maximum luminance value that is of the pixels in the to-be-processed frame of the source image signal and that is obtained after the normalization processing.

In some embodiments, L3 is MaxSource.

It should be understood that when any parameter in a, p, and m is obtained in advance in another manner, values of the other two unknown parameters can be obtained by using only any two equations in the system of equations.

In a feasible implementation, a and p are obtained by solving the following system of equations:

$$\begin{cases} a \times \left( \dfrac{p \times M1}{(p-1 \times M1 + 1} \right)^m + b = N1 \\ a \times \left( \dfrac{p \times L3}{(p-1) \times L3 + 1} \right)^m + b = F3 \end{cases},$$

where

F1 is the value that is of 1 nit and that is obtained after the normalization processing, F2 is the mapped value that is of the source image signal to the display device and that is obtained after the normalization processing, F3 is the maximum luminance value that is of the display device and that is obtained after the normalization processing, L1 is the perceived luminance value that is of the source image signal and that is obtained after the normalization processing, L2 is the average luminance value that is of the pixels in the to-be-processed frame of the source image signal and that is obtained after the normalization processing, and L3 is the maximum luminance value that is of the pixels in the to-be-processed frame of the source image signal and that is obtained after the normalization processing; and when L2 is less than a value that is of 5 nits and that is obtained after normalization processing, M1 is equal to L1 and N1 is equal to F1; or when L2 is greater than or equal to the value that is of 5 nits and that is obtained after the normalization processing, M1 is equal to L2 and N1 is equal to F2. It should be understood that, for example, 5 nits may be used as a threshold. Alternatively, the threshold may be another value. This is not limited.

In a feasible implementation, the mapped value is obtained according to the following formula:

$$y(i) = \frac{\sum_{k=0}^{N_{frame}} q(i)}{N_{frame}}, \text{ where}$$

$$q(i) = \begin{cases} \text{MaxDisplay} & LR \times f(i) \geq \text{MaxDisplay} \\ \text{MinDisplay} & LR \times f(i) \leq \text{MinDisplay}, \\ LR \times f(i) & \text{otherwise} \end{cases}$$

y(i) is the mapped value, f(i) is a maximum luminance value of an $i^{th}$ pixel in the pixels in the to-be-processed frame of the source image signal, MaxDisplay and MinDisplay are the maximum luminance value and the minimum luminance value of the display device, $N_{frame}$ is a number of pixels in the to-be-processed frame, LR is a perceived luminance compensation factor, and 0<LR≤2.

In a feasible implementation, LR is 0.8, 1, or 1.2.

In a feasible implementation, the perceived luminance value satisfies: J(Lp)−J(1 nit)=(J(L0)−J(1 nit))*Rate, where Lp is the perceived luminance value, L0 is a preset luminance value, Rate is a preset rate, and J(x) is a proportion of pixels whose luminance is less than x nits in the to-be-processed frame of the source image signal.

In a feasible implementation, the preset luminance value is 5 nits, and the preset rate is 10%, 20%, or 30%.

In a feasible implementation, the perceived luminance value is obtained by decoding the metadata.

In a feasible implementation, a is a difference between the maximum luminance value that is of the display device and that is obtained after the normalization processing and the minimum luminance value of the display device and that is obtained after the normalization processing.

In a feasible implementation, p is obtained according to the following formula: p=c*v+d, where c and d are preset values.

In a feasible implementation, c is 7, and d is 3.

In a feasible implementation, v is obtained according to the following formula:

v=J(Tq)−J(Tp), where

J(x) is the proportion of the pixels whose luminance is less than x nits in the to-be-processed frame of the source image signal, Tp is the value that is of 1 nit and that is obtained after the normalization processing, and Tq is Tp multiplied by a ratio of the maximum luminance value that is of the pixels in the to-be-processed frame of the source image signal and that is obtained after the normalization processing to the maximum value that is of the display device and that is obtained after the normalization processing.

In a feasible implementation, the normalization processing includes: a process of converting a to-be-normalized signal into a non-linear PQ signal value according to a process specified in the ST 2084 or 2014-SMPTE standard, or a process of converting a to-be-normalized signal into a non-linear HLG signal value according to a process specified in the Rec. 2100-ITU standard.

In a feasible implementation, the method further includes: obtaining, through decoding, the maximum luminance value of the pixels in the to-be-processed frame of the source image signal from the metadata; and correcting the maximum luminance value of the pixels in the to-be-processed frame of the source image signal; and correspondingly, that at least one of $k_1$, $k_2$, $k_3$, a, b, m, n, and p is obtained through calculation based on the information about the source image signal and/or the information about the display device includes: at least one of $k_1$, $k_2$, $k_3$, a, b, m, n, and p is obtained based on a corrected value of the maximum luminance value of the pixels in the to-be-processed frame of the source image signal.

A second aspect of this application provides an apparatus for processing image signal conversion. The apparatus includes: an obtaining module, configured to obtain a primary color component of a to-be-processed pixel; and a conversion module, configured to convert a first value of the primary color component into a second value based on a preset dynamic range conversion model, where the dynamic range conversion model is as follows:

$$L' = F(L) = a \times \left( \frac{p \times L^n}{(k_1 \times p - k_2) \times L^n + k_3} \right)^m + b,$$

where

L is the first value, L' is the second value, and $k_1$, $k_2$, $k_3$, a, b, m, n, and p are model parameters.

In a feasible implementation, before the converting a first value of the primary color component into a second value based on a preset dynamic range conversion model, the obtaining module is further configured to determine a method for obtaining the model parameter based on identifier information carried in metadata, where the metadata includes static metadata and/or dynamic metadata.

In a feasible implementation, the metadata and the to-be-processed pixel are obtained by decoding a bitstream related to a source image signal.

In a feasible implementation, the method for obtaining the model parameter includes: obtaining, through decoding, a value that is of the model parameter and that is carried in the metadata; using a preset value as a value of the model parameter; or obtaining a value of the model parameter through calculation based on information about the source image signal and/or information about a display device, where the information about the source image signal is obtained by decoding the metadata.

In a feasible implementation, at least one of $k_1$, $k_2$, $k_3$, a, b, m, n, and p is obtained by obtaining, through decoding, the value that is of the model parameter and that is carried in the metadata.

In a feasible implementation, at least one of $k_1$, $k_2$, $k_3$, m, and n is obtained based on the preset value, where $0 < n \leq 8$, and $0 < m \leq 8$.

In a feasible implementation, $k_1$ is 1. In a feasible implementation, $k_2$ is 1. In a feasible implementation, $k_3$ is 1. In a feasible implementation, m is 2.4 or 1. In a feasible implementation, n is 1 or 5/12.

In a feasible implementation, b is a minimum luminance value that is of the display device and that is obtained after normalization processing.

In a feasible implementation, $k_3$ is a maximum luminance value that is of pixels in a to-be-processed frame of the source image signal and that is obtained after normalization processing.

In a feasible implementation, the maximum luminance value of the pixels in the to-be-processed frame of the source image signal includes: a maximum value in luminance components of the pixels in the to-be-processed frame; or a maximum value in maximum primary color components of the pixels in the to-be-processed frame, where the maximum primary color component is a primary color component with a maximum value in a plurality of primary color components of one pixel.

In a feasible implementation, at least one of $k_1$, $k_2$, $k_3$, a, b, m, n, and p is obtained through calculation based on the information about the source image signal and/or the information about the display device.

In a feasible implementation, the information about the source image signal includes an average luminance value of the pixels in the to-be-processed frame of the source image signal, and p is obtained according to the following formula:

$$p = \begin{cases} p_{valueH} & avgL > TPH \\ p_{valueH} \times g\left(\frac{avgL-TPL}{TPH-TPL}\right) + p_{valueL} \times \left(1 - g\left(\frac{avgL-TPL}{TPH-TPL}\right)\right) & avgL \geq TPL,\ avgL \leq TPH, \\ p_{valueL} & avgL < TPL \end{cases}$$

where avgL is an average luminance value that is of the pixels in the to-be-processed frame of the source image signal and that is obtained after normalization processing, TPH, TPL, $p_{valueH}$, and $p_{valueL}$ are all preset values, $0 \leq TPL, TPH \leq 1$, and go is a monotonically increasing function in an interval from 0 to 1.

In a feasible implementation, TPL is 0.5, TPH is 0.8, $p_{valueL}$ is 3.5, $p_{valueH}$ is 5.0, and $g(x)=x$, where x is a rational number in the interval from 0 to 1.

In a feasible implementation, the average luminance value of the pixels in the to-be-processed frame of the source image signal includes: an average value of the luminance components of the pixels in the to-be-processed frame; or an average value of the maximum primary color components of the pixels in the to-be-processed frame.

In a feasible implementation, the information about the source image signal includes the maximum luminance value of the pixels in the to-be-processed frame of the source image signal and a minimum luminance value of the pixels in the to-be-processed frame of the source image signal, and a is obtained according to the following formula:

$a=(MaxDisplay-MinDisplay)/(H(MaxSource)-H(MinSource))$, where

MaxSource is the maximum luminance value that is of the pixels in the to-be-processed frame of the source image signal and that is obtained after the normalization processing, MinSource is a minimum luminance value that is of the pixels in the to-be-processed frame of the source image signal and that is obtained after normalization processing, MaxDisplay is a maximum luminance value that is of the display device and that is obtained after normalization processing, MinDisplay is the minimum luminance value that is of the display device and that is obtained after the normalization processing, and $$H(L) = \left( \frac{p \times L^n}{(k_1 \times p - k_2) \times L^n + k_3} \right)^m.$$

In a feasible implementation, the minimum luminance value of the pixels in the to-be-processed frame of the source image signal includes: a minimum value in the luminance components of the pixels in the to-be-processed frame; or a minimum value in the maximum primary color components of the pixels in the to-be-processed frame.

In a feasible implementation, a, p, and m are obtained by solving the following system of equations:

$$\begin{cases} a \times \left(\dfrac{p \times L1}{(p-1) \times L1 + 1}\right)^m + b = F1 \\ a \times \left(\dfrac{p \times L2}{(p-1) \times L2 + 1}\right)^m + b = F2 \\ a \times \left(\dfrac{p \times L3}{(p-1) \times L3 + 1}\right)^m + b = F3 \end{cases}$$

where

F1 is a value that is of 1 nit and that is obtained after normalization processing, F2 is a mapped value that is of the source image signal to the display device and that is obtained after normalization processing, F3 is the maximum luminance value that is of the display device and that is obtained after the normalization processing, L1 is a perceived luminance value that is of the source image signal and that is obtained after normalization processing, L2 is the average luminance value that is of the pixels in the to-be-processed frame of the source image signal and that is obtained after the normalization processing, and L3 is the maximum luminance value that is of the pixels in the to-be-processed frame of the source image signal and that is obtained after the normalization processing.

In some embodiments, L3 is MaxSource.

In a feasible implementation, a and p are obtained by solving the following system of equations:

$$\begin{cases} a \times \left(\dfrac{p \times M1}{(p-1 \times M1 + 1)}\right)^m + b = N1 \\ a \times \left(\dfrac{p \times L3}{(p-1) \times L3 + 1}\right)^m + b = F3 \end{cases},$$

where

F1 is the value that is of 1 nit and that is obtained after the normalization processing, F2 is the mapped value that is of the source image signal to the display device and that is obtained after the normalization processing, F3 is the maximum luminance value that is of the display device and that is obtained after the normalization processing, L1 is the perceived luminance value that is of the source image signal and that is obtained after the normalization processing, L2 is the average luminance value that is of the pixels in the to-be-processed frame of the source image signal and that is obtained after the normalization processing, and L3 is the maximum luminance value that is of the pixels in the to-be-processed frame of the source image signal and that is obtained after the normalization processing; and when L2 is less than a value that is of 5 nits and that is obtained after normalization processing, M1 is equal to L1 and N1 is equal to F1; or when L2 is greater than or equal to the value that is of 5 nits and that is obtained after the normalization processing, M1 is equal to L2 and N1 is equal to F2.

In a feasible implementation, the mapped value is obtained according to the following formula:

$$y(i) = \dfrac{\sum_{k=0}^{N_{frame}} q(i)}{N_{frame}}, \text{ where}$$

$$q(i) = \begin{cases} \text{Max}Display & LR \times f(i) \geq \text{Max}Display \\ \text{Min}Display & LR \times f(i) \leq \text{Min}Display \\ LR \times f(i) & \text{otherwise} \end{cases}$$

where y(i) is the mapped value, f(i) is a maximum luminance value of an $i^{th}$ pixel in the pixels in the to-be-processed frame of the source image signal, MaxDisplay and MinDisplay are the maximum luminance value and the minimum luminance value of the display device, $N_{frame}$ is a number of pixels in the to-be-processed frame, LR is a perceived luminance compensation factor, and 0<LR≤2.

In a feasible implementation, LR is 0.8, 1, or 1.2.

In a feasible implementation, the perceived luminance value satisfies: J(Lp)−J(1 nit)=(J(L0)−J(1 nit))*Rate, where Lp is the perceived luminance value, L0 is a preset luminance value, Rate is a preset rate, and J(x) is a proportion of pixels whose luminance is less than x nits in the to-be-processed frame of the source image signal.

In a feasible implementation, the preset luminance value is 5 nits, and the preset rate is 10%, 20%, or 30%.

In a feasible implementation, the perceived luminance value is obtained by decoding the metadata.

In a feasible implementation, a is a difference between the maximum luminance value that is of the display device and that is obtained after the normalization processing and the minimum luminance value that is of the display device and that is obtained after the normalization processing.

In a feasible implementation, p is obtained according to the following formula: p=c*v+d, where c and d are preset values.

In a feasible implementation, c is 7, and d is 3.

In a feasible implementation, v is obtained according to the following formula:

v=J(Tq)−J(Tp), where

J(x) is the proportion of the pixels whose luminance is less than x nits in the to-be-processed frame of the source image signal, Tp is the value that is of 1 nit and that is obtained after the normalization processing, and Tq is Tp multiplied by a ratio of the maximum luminance value that is of the pixels in the to-be-processed frame of the source image signal and that is obtained after the normalization processing to the maximum value that is of the display device and that is obtained after the normalization processing.

In a feasible implementation, the normalization processing includes: a process of converting a to-be-normalized signal into a non-linear PQ signal value according to a process specified in the ST 2084 or 2014-SMPTE standard, or a process of converting a to-be-normalized signal into a non-linear HLG signal value according to a process specified in the Rec. 2100-ITU standard.

In a feasible implementation, the obtaining module is further configured to: obtain, through decoding, the maximum luminance value of the pixels in the to-be-processed frame of the source image signal from the metadata; and correct the maximum luminance value of the pixels in the to-be-processed frame of the source image signal; and correspondingly, that at least one of $k_1$, $k_2$, $k_3$, a, b, m, n, and p is obtained through calculation based on the information about the source image signal and/or the information about the display device includes: at least one of $k_1$, $k_2$, $k_3$, a, b, m, n, and p is obtained based on a corrected value of the maximum luminance value of the pixels in the to-be-processed frame of the source image signal.

A third aspect of this application provides an image processing device, including: a nonvolatile memory and a processor that are coupled to each other. The processor invokes program code stored in the memory, to perform the method according to the first aspect.

A fourth aspect of this application provides a computer-readable storage medium. The computer-readable storage medium stores a computer program. When the computer program runs on a processor, the method according to the first aspect is implemented.

It should be understood that, technical solutions in the second to the fourth aspects of this application are consistent with those in the first aspect, and beneficial effects achieved by feasible implementations are similar, and details are not described again.

BRIEF DESCRIPTION OF DRAWINGS

To describe the technical solutions in embodiments of the present invention more clearly, the following briefly describes the accompanying drawings for describing the embodiments. It is clear that, the accompanying drawings in the following description show merely some embodiments of the present invention, and a person of ordinary skill in the art may still derive other drawings from these accompanying drawings without creative efforts.

FIG. 2A and FIG. 2B are a schematic flowchart of a method for processing image signal conversion according to an embodiment of this application;

DESCRIPTION OF EMBODIMENTS

Figure 1:
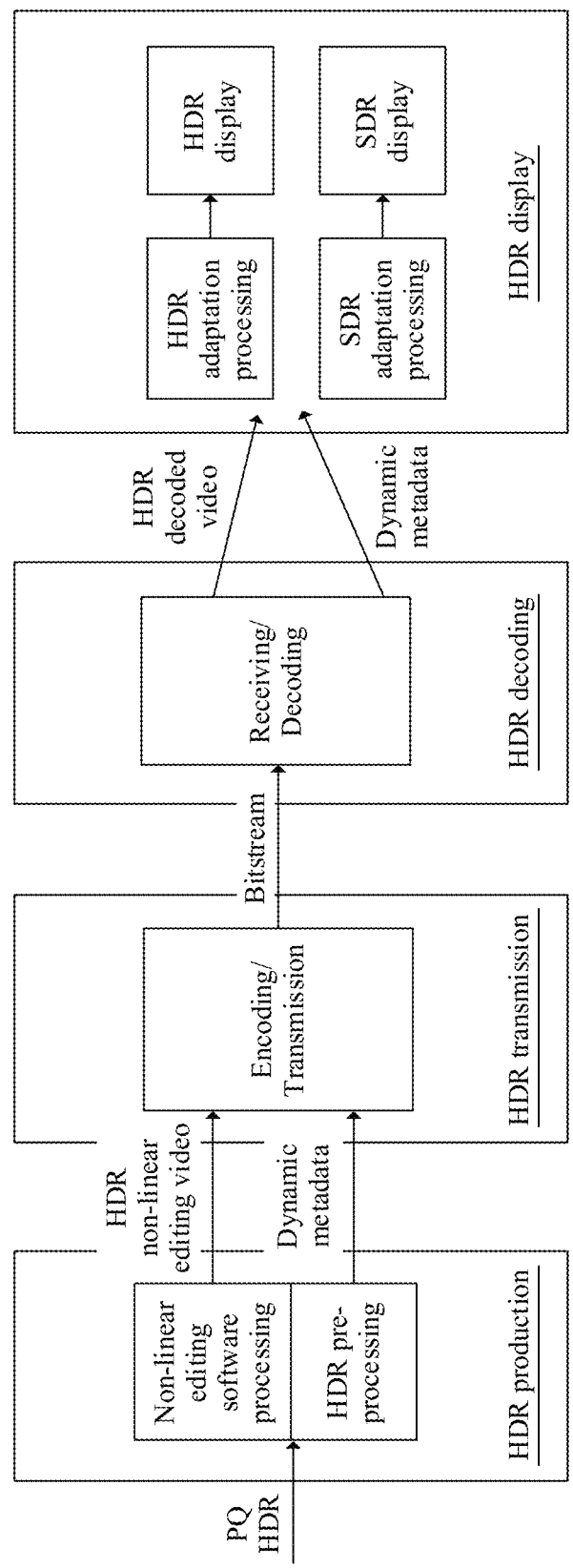
FIG. 1 is a schematic diagram of a system for processing image signal conversion according to an embodiment of this application.

The following clearly describes the technical solutions in embodiments of the present invention with reference to the accompanying drawings in embodiments of the present invention.

Before specific implementations are described, terms that may be used in the embodiments of this application are first described.

Maximum luminance value (max_display_mastering_luminance) of a display device: The maximum luminance value is a 16-bit unsigned integer, represents maximum display luminance of the display device, is in a unit of 1 cd/m², and ranges from 1 cd/m² to 65535 cd/m².

Minimum luminance value (min_display_mastering_luminance) of the display device: The minimum luminance value is a 16-bit unsigned integer, represents minimum display luminance of the display device, is in a unit of 0.0001 cd/m², and ranges from 0.0001 cd/m² to 6.5535 cd/m². A value of max_display_mastering_luminance should be greater than a value of min_display_mastering_luminance.

Minimum value (minimum_maxrgb) in maximum primary color component values of pixels of a source image signal, also referred to as minimum value in RGB component maximum values: Maximum values in RGB components of all pixels of a scene or a frame of picture are obtained, and a minimum value in these maximum values is obtained.

Average value (average_maxrgb) of the maximum primary color component values of the pixels of the source image signal, also referred to as average value of the RGB component maximum values: The maximum values in the RGB components of all the pixels of the scene or the frame of picture are obtained, and an average value of these maximum values is obtained.

Maximum value (maximum_maxrgb) in the maximum primary color component values of the pixels of the source image signal, also referred to as maximum value in the RGB component maximum values: The maximum values in the RGB components of all the pixels of the scene or the frame of picture are obtained, and a maximum value in these maximum values is obtained.

Metadata: The metadata records key information of an image in a video, a scene, or a frame.

Static metadata: The static metadata is metadata that does not change in a sequence.

Dynamic metadata: The dynamic metadata is metadata that changes with an image or a scene.

PQ HDR video: The PQ HDR video is an HDR video transmitted in a PQ format.

HLG HDR video: The HLG HDR video is an HDR video transmitted in an HLG format.

HDR non-linear editing video: The HDR non-linear editing video is a video processed by non-linear editing software.

It should be understood that, in this embodiment of this application, when A>B, a step C is performed or a state C is presented; or when A≤B, another step D is performed or another state D is presented. It should be understood that, when A=B, in some feasible implementations, performing a step C or presenting a state C may be alternatively met, that is, when A B, the step C is performed or the state C is presented; or when A≤B, another step D is performed or another state D is presented. The embodiments of this application include both the two feasible implementations, and details are not described below again.

FIG. 1 is a schematic diagram of a system for processing image signal conversion according to an embodiment of this application. As shown in FIG. 1, an HDR end-to-end processing system is generally divided into four parts: HDR production, HDR transmission, HDR decoding, and HDR display.

The HDR production includes editing an HDR material, performing color correction processing, outputting an HDR non-linear editing video, and extracting dynamic metadata of the HDR non-linear editing video through HDR pre-processing.

The HDR transmission includes performing, according to a video compression standard (such as an AVS or HEVC standard), video encoding on the HDR non-linear editing video and the HDR dynamic metadata that are obtained after the HDR production, and outputting a corresponding bitstream (an AVS or HEVC bitstream).

The HDR decoding includes decoding the generated bitstream according to a standard corresponding to a bitstream format, and outputting an HDR decoded video and the HDR dynamic metadata.

HDR display or SDR display: The HDR display is processing the HDR decoded video with reference to the HDR dynamic metadata and a target display terminal parameter (HDR adaptation processing), and displaying a processed HDR video (an HDR adapted video) on an HDR display terminal, where the target display terminal parameter is a luminance range of a target display terminal. The SDR display is processing the HDR video with reference to the HDR dynamic metadata and a target display terminal parameter (SDR adaptation processing), and displaying a processed HDR video (an SDR adapted video) on an SDR display terminal, where the target display terminal parameter is a luminance range of a target display terminal.

Figure 2A:
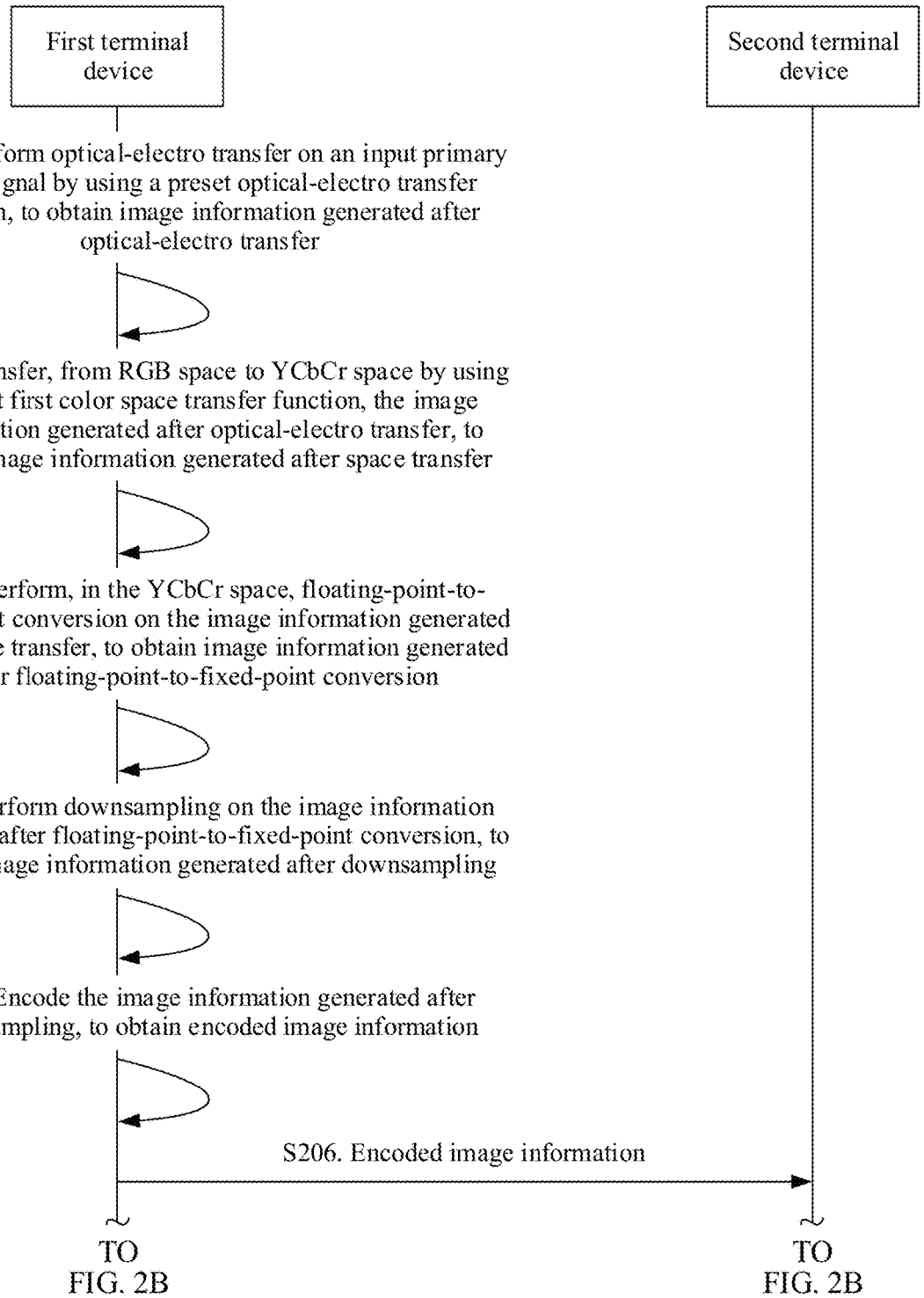

FIG. 2A and FIG. 2B are a schematic flowchart of a method for processing image signal conversion according to an embodiment of this application. As shown in the figure, the method for processing image signal conversion in this embodiment of the present invention may at least include the following steps.

S201. A first terminal device performs optical-electro transfer on an input primary color signal by using a preset optical-electro transfer function, to obtain image information generated after optical-electro transfer.

The terminal device may perform optical-electro transfer on the input primary color signal by using the preset optical-electro transfer function, to obtain the image information generated after optical-electro transfer. The terminal device may be a satellite, a personal computer (PC), a smartphone, or the like.

S202. The first terminal device transfers, from RGB space to YCbCr space by using a preset first color space transfer function, the image information generated after optical-electro transfer, to obtain image information generated after space transfer.

S203. The first terminal device performs, in the YCbCr space, floating-point-to-fixed-point conversion on the image information generated after space transfer, to obtain image information generated after floating-point-to-fixed-point conversion.

S204. The first terminal device performs downsampling on the image information generated after floating-point-to-fixed-point conversion, to obtain image information generated after downsampling.

S205. The first terminal device encodes the image information generated after downsampling, to obtain encoded image information.

S206. The first terminal device sends the encoded image information to a second terminal device.

S207. The second terminal device decodes the encoded image information, to obtain decoded image information.

S208. The second terminal device performs upsampling on the decoded image information, to obtain image information generated after upsampling.

S209. The second terminal device performs fixed-point-to-floating-point conversion on the image information generated after upsampling, to obtain image information generated after fixed-point-to-floating-point conversion.

S210. The second terminal device transfers, from the YCbCr space to the RGB space by using a preset second color space transfer function, the image information generated after fixed-point-to-floating-point conversion, to obtain image information generated after space transfer.

S211. The second terminal device performs, by using a preset electro-optical transfer function, electro-optical transfer on the image information generated after space transfer, to obtain an output primary color signal.

S212. The second terminal device outputs the primary color signal.

In the method for processing image signal conversion shown in FIG. 2A and FIG. 2B, the first terminal device performs optical-electro transfer on the input primary color signal by using the preset optical-electro transfer function, to obtain the image information generated after optical-electro transfer; transfers, from the RGB space to the YCbCr space by using the preset first color space transfer function, the image information generated after optical-electro transfer, to obtain the image information generated after space transfer; performs, in the YCbCr space, floating-point-to-fixed-point conversion on the image information generated after space transfer, to obtain the image information generated after floating-point-to-fixed-point conversion; performs downsampling on the image information generated after floating-point-to-fixed-point conversion, to obtain the image information generated after downsampling; encodes the image information generated after downsampling; and sends the encoded image information to the second terminal device. The second terminal device decodes the encoded image information, to obtain the decoded image information; performs upsampling on the decoded image information, to obtain the image information generated after upsampling; performs fixed-point-to-floating-point conversion on the image information generated after upsampling, to obtain the image information generated after fixed-point-to-floating-point conversion; transfers, from the YCbCr space to the RGB space by using the preset second color space transfer function, the image information generated after fixed-point-to-floating-point conversion, to obtain the image information generated after space transfer; performs, by using the preset electro-optical transfer function, electro-optical transfer on the image information generated after space transfer, to obtain the output primary color signal; and outputs the primary color signal. In this way, quantization quality can be improved, and resource utilization can be improved.

Figure 3:
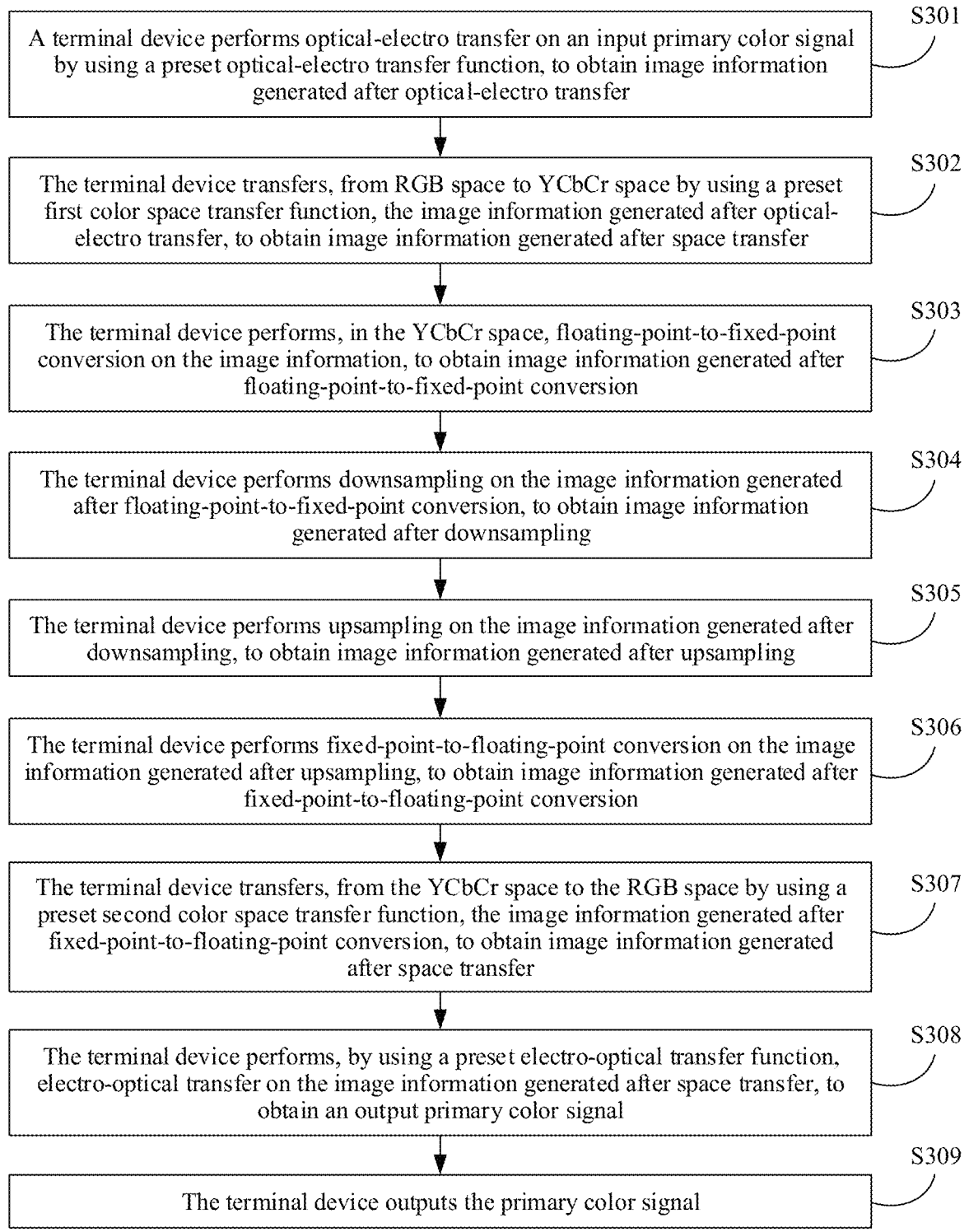
FIG. 3 is a schematic flowchart of another method for processing image signal conversion according to an embodiment of this application.

FIG. 3 is a schematic flowchart of a method for processing image signal conversion according to another embodiment of this application. The method for processing image signal conversion in the embodiment shown in FIG. 3 may at least include the following steps.

S301. A terminal device performs optical-electro transfer on an input primary color signal by using a preset optical-electro transfer function, to obtain image information generated after optical-electro transfer.

The terminal device may perform optical-electro transfer on the input primary color signal by using the preset optical-electro transfer function, to obtain the image information generated after optical-electro transfer. The terminal device may be a smartphone, a camera, a tablet computer, or the like. This image may be collected by the camera or stored locally in advance.

S302. The terminal device transfers, from RGB space to YCbCr space by using a preset first color space transfer function, the image information generated after optical-electro transfer, to obtain image information generated after space transfer.

S303. The terminal device performs, in the YCbCr space, floating-point-to-fixed-point conversion on the image information, to obtain image information generated after floating-point-to-fixed-point conversion.

S304. The terminal device performs downsampling on the image information generated after floating-point-to-fixed-point conversion, to obtain image information generated after downsampling.

S305. The terminal device performs upsampling on the image information generated after downsampling, to obtain image information generated after upsampling.

S306. The terminal device performs fixed-point-to-floating-point conversion on the image information generated after upsampling, to obtain image information generated after fixed-point-to-floating-point conversion.

S307. The terminal device transfers, from the YCbCr space to the RGB space by using a preset second color space transfer function, the image information generated after fixed-point-to-floating-point conversion, to obtain image information generated after space transfer.

S308. The terminal device performs, by using a preset electro-optical transfer function, electro-optical transfer on the image information generated after space transfer, to obtain an output primary color signal.

S309. The terminal device outputs the primary color signal.

In the method for processing image signal conversion shown in FIG. 3, the terminal device performs optical-electro transfer on the input primary color signal by using the preset optical-electro transfer function, to obtain the image information generated after optical-electro transfer; transfers, from the RGB space to the YCbCr space by using the preset first color space transfer function, the image information generated after optical-electro transfer, to obtain the image information generated after space transfer; performs, in the YCbCr space, floating-point-to-fixed-point conversion on the image information generated after space transfer, to obtain the image information generated after floating-point-to-fixed-point conversion; performs downsampling on the image information generated after floating-point-to-fixed-point conversion, to obtain the image information generated after downsampling; performs upsampling on the image information generated after downsampling, to obtain the image information generated after upsampling; performs fixed-point-to-floating-point conversion on the image information generated after upsampling, to obtain the image information generated after fixed-point-to-floating-point conversion; transfers, from the YCbCr space to the RGB space by using the preset second color space transfer function, the image information generated after fixed-point-to-floating-point conversion, to obtain the image information generated after space transfer; performs, by using the preset electro-optical transfer function, electro-optical transfer on the image information generated after space transfer, to obtain the output primary color signal; and outputs the primary color signal. In this way, quantization quality can be improved, and resource utilization can be improved.

It should be understood that, an entire process of image signal conversion is described as an example in each of the methods for processing image signal conversion in FIG. 2A and FIG. 2B and FIG. 3. This application mainly includes a dynamic range conversion module of an image signal and a corresponding processing method. For example, determining the optical-electro transfer process and the optical-electro transfer function in the foregoing embodiments may be combined in another process for processing image signal conversion that includes the processes in FIG. 2A and FIG. 2B and FIG. 3. This is not limited in this application.

Dynamic range conversion is mainly applied to adaptation of a front-end HDR signal to a back-end HDR terminal display device. For example, a luminance interval of a light signal collected by a front end is 4000 nits, but a display capability of a back-end HDR terminal display device (a television or an iPad) is only 500 nits. Mapping the 4000-nit signal to the 500-nit display device is a process of dynamic range mapping (tone-mapping) from high to low. In another example, a luminance interval of an SDR signal (a standard dynamic range signal, falling within the foregoing LDR in comparison with HDR) collected by a front end is 100 nits, but a display end needs to display a 2000-nit television signal. Displaying the 100-nit signal on a 2000-nit display device is a process of tone-mapping from high to low.

Figure 4:
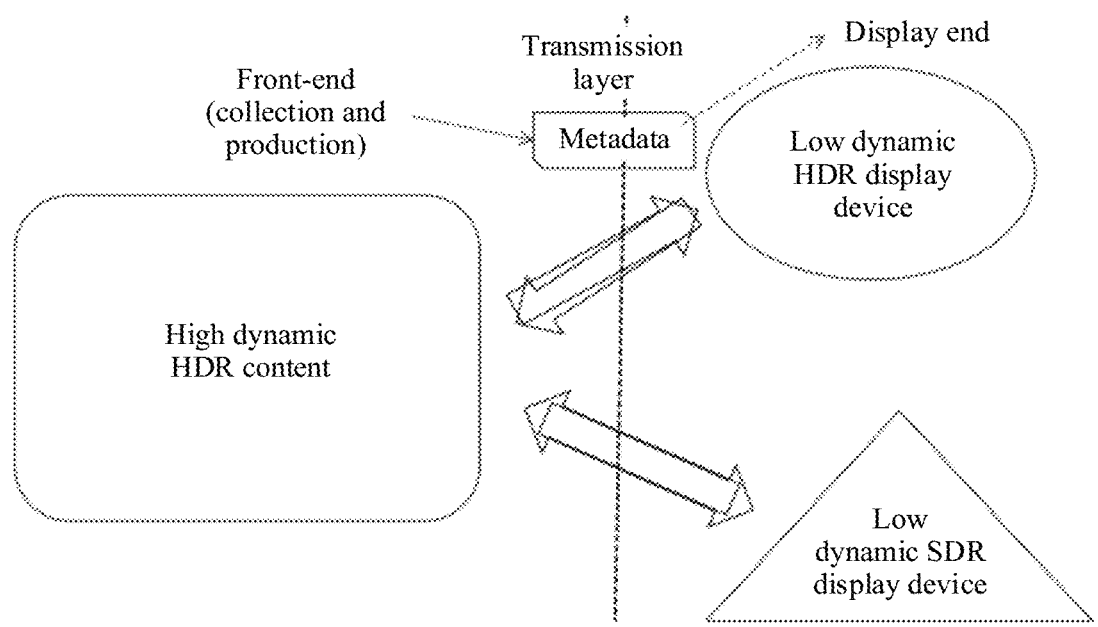
FIG. 4 is a schematic diagram of a system architecture to which image signal conversion is applied according to an embodiment of this application.

FIG. 4 describes an example of a system architecture to which the embodiments of this application are applied. In a feasible implementation, a front-end device (including video collection and production devices) completes production of high dynamic HDR content, and transmits video source data (image information) and metadata (dynamic metadata and/or static metadata) to a display end by using a transmission layer. The display end converts, based on display capabilities (SDR or HDR) of different display devices, the received video source data (in some embodiments, in combination with information provided in the metadata) into a displayed image to which the display device adapts. It should be understood that "low dynamic" in "low dynamic HDR" and "low dynamic SDR" in FIG. 4 is described relative to the high dynamic HDR content generated by a front end. It should be further understood that, in a different embodiment, a display device may have a display capability of a higher dynamic range than HDR content generated by a front end, and an adaption display process thereof may also be applied to the system architecture. This is not limited in this application.

For example, the dynamic range conversion module in the embodiments of this application may exist in a set-top box, a television display, a mobile terminal display, or a video conversion device of a network live broadcast, a network video application, or the like. More specifically, the module may exist in the set-top box, the television display, or the mobile terminal display in a chip form, or may exist in the video conversion device of the network live broadcast, the network video application, or the like in a software program form.

Figure 5:
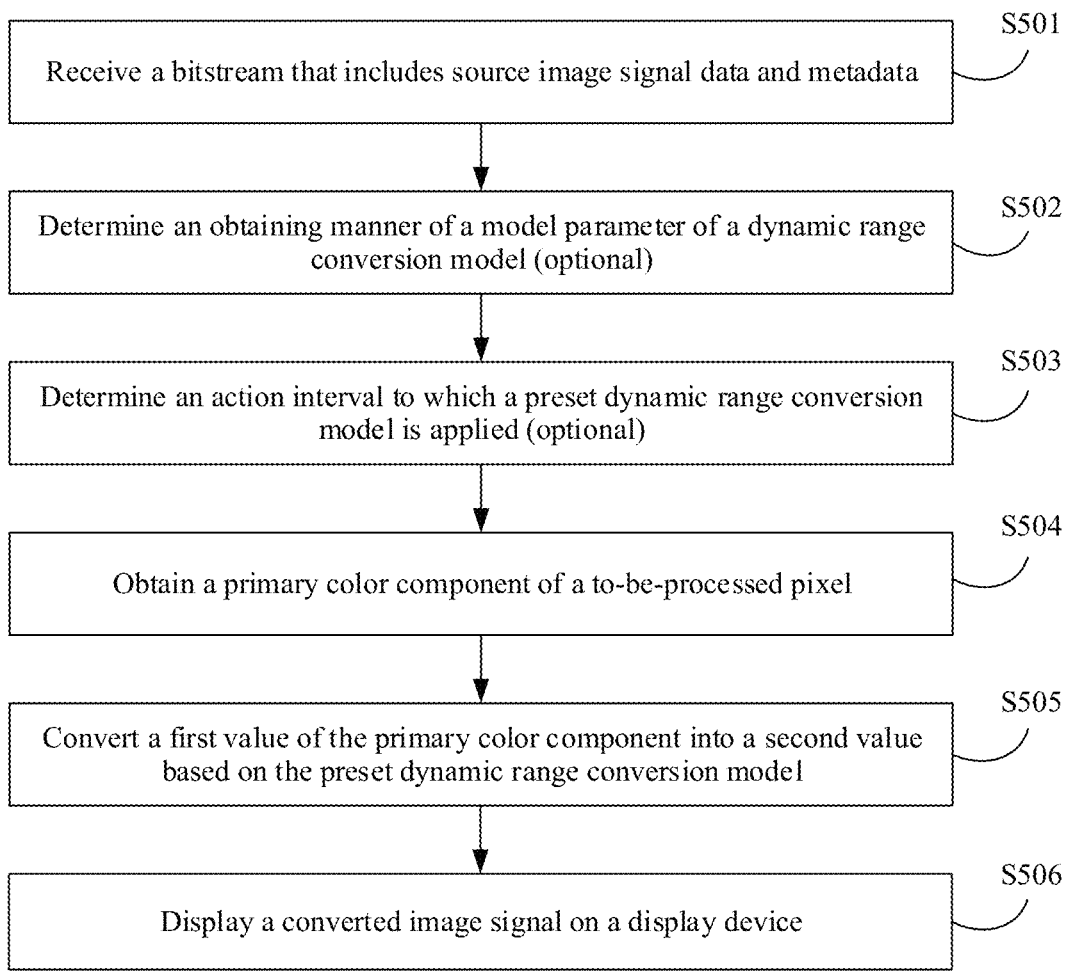
FIG. 5 is a schematic flowchart of another method for processing image signal conversion according to an embodiment of this application.

FIG. 5 is a schematic flowchart of a method for processing image signal conversion according to another embodiment of this application. The method for processing image signal conversion in the embodiment shown in FIG. 5 may include at least the following steps.

S501. Receive a bitstream that includes source image signal data and metadata.

Usually, both the source image signal data (an HDR video signal) and the metadata are transmitted in a bitstream form. The bitstream is obtained by encoding image data and auxiliary information at a video content production end, and is restored to the source image signal data and the metadata in a lossy or lossless manner through decoding at a display end. The source image signal data may be pixel data, and the metadata may include a format of video source data and various parameters related to HDR video processing, such as parameters in a dynamic range conversion model.

It should be understood that a format of the source image signal data is not limited in this embodiment of this application. For example, the source image signal data may be data in YUV color space or data in RGB color space; or may be 8-bit data, 10-bit data, or 12-bit data.

It should be further understood that, in this embodiment of this application, a format of the metadata is not limited. For example, the metadata may conform to the standard ST2094-40 and include histogram information and tone-mapping curve parameter information, or may conform to the standard ST2094-10 and include tone-mapping curve parameter information. The metadata may be dynamic metadata or static metadata, or may include both static metadata and dynamic metadata.

The source image signal data received in this embodiment of this application may be an optical signal, or may be an electrical signal. This is not limited in this application.

S502. Optionally, determine a method of obtaining a model parameter of a dynamic range conversion model.

In a feasible implementation, the method of obtaining the model parameter is preset, that is, a method of obtaining each model parameter is determined according to a protocol known by both an HDR production end and an HDR display end in advance.

In another feasible implementation, a method of obtaining each model parameter may be adaptively determined based on information about the source image signal data, such as a distribution characteristic of luminance values in a luminance histogram.

In another feasible implementation, a plurality of methods of obtaining may be predefined. The HDR production end writes a selected methods of obtaining into identifier information of the metadata, and the HDR display end decodes the identifier information in the metadata to learn of the specific method of obtaining.

For example, the method of obtaining the model parameter may include: obtaining, through decoding, a value that is of the model parameter and that is carried in the metadata, where the value of the model parameter is directly written into the metadata at the HDR production end; using a preset value as a value of the model parameter; or obtaining a value of the model parameter through calculation based on the information about the source image signal and/or information about a display device, where the information about the source image signal is obtained by decoding the metadata.

Further, the information about the source image signal may be directly included in the metadata as a syntax element, or the information about the source image signal may be obtained by first parsing a syntax element of the metadata and then performing derivation calculation based on a syntax element obtained after the parsing. For example, the information about the source image signal includes a maximum luminance value of pixels in a to-be-processed frame of the source image signal, an average luminance value of the pixels in the to-be-processed frame of the source image signal, a minimum luminance value of the pixels in the to-be-processed frame of the source image signal, or the like.

It should be understood that, to deal with a relatively large frame-by-frame change of a highlighted area such as the sun and adverse impact on overall luminance estimation, the maximum luminance value of the pixels in the to-be-processed frame of the source image signal needs to be corrected, to eliminate interference from the highlighted area to calculate a more appropriate model parameter. A corrected value is less than or equal to the maximum value of the actual pixels in the to-be-processed frame. Specifically, a value may be set, so that a preset proportion of pixels whose luminance is greater than that of a darkest pixel and is less than the value in all the pixels is, for example, 99%, 95%, or 90%. The value is the corrected value. The corrected value may be alternatively set to the average value of all the pixels plus (luminance 1-luminance 2)/2, where the luminance 1 satisfies a case in which pixels whose luminance is greater than that of the darkest pixel and is less than the luminance 1 account for 90% of all the pixels, and the luminance 2 satisfies a case in which pixels whose luminance is greater than that of the darkest pixel and is less than the luminance 2 account for 10% of all the pixels. In this embodiment of this application, a corrected maximum luminance value of the pixels in the to-be-processed frame of the source image signal is referred to as the corrected value of the maximum luminance value of the pixels in the to-be-processed frame of the source image signal.

In some feasible implementations, the pixels in the to-be-processed frame may be all pixels in the to-be-processed frame, or may be effective pixels in the to-be-processed frame. The effective pixel is a pixel in a preset range of the source image signal, or a pixel in a range determined based on the metadata. For example, the effective pixel may be a source image signal within a dark threshold and a bright threshold. The dark threshold may be a preset threshold. Alternatively, a preset proportion is set in the source image signal, so that the dark threshold satisfies a case in which pixels whose luminance is less than the dark threshold account for the preset proportion of all the pixels in the source image signal, to obtain the dark threshold, where the preset proportion may be 0%, 0.5%, 1%, 5%, 10%, or the like. The bright threshold may be a preset threshold. Alternatively, a preset proportion is set in the source image signal, so that the bright threshold satisfies a case in which pixels whose luminance is greater than the bright threshold account for the preset proportion of all the pixels in the source image signal, to obtain the bright threshold, where the preset proportion may be 0%, 0.5%, 1%, 5%, 10%, or the like.

It should be understood that there may be a plurality of model parameters. The identifier information may indicate a same method of obtaining jointly used by one group of model parameters, or may indicate a preset method of obtaining combination. In this combination, different model parameters may use a same method of obtaining or different methods of obtaining.

It should be further understood that an image corresponding to the source image signal may include different areas, and different areas may have respective methods of obtaining different model parameter, may have respective different model parameter values, or may have respective different conversion models. This is not limited.

In a specific embodiment, a syntax table of the dynamic metadata includes:

```
for(w=0; w<num_windows; w++)
    tone_mapping_mode[w]
```

That is, the image corresponding to the source image signal may include num_windows areas. For each area, one piece of identifier information tone_mapping_mode is decoded, to determine a method of obtaining a model parameter in the area.

For example, a relationship between a value of tone_mapping_mode and a number of to-be-determined model parameters may be as follows:

|  | Identifier | | | | | | |
|---|---|---|---|---|---|---|---|
| Index | 0 | 1 | 2 | 3 | 4 | 5 | 6 |
| Number of to-be-determined parameters | 0 | 0 | 0 | 3 | 3 | 1 | 8 |

For example, a relationship between a value of tone_mapping_mode and a method of obtaining a model parameter may be as follows:

|  | Identifier | | | | | | |
|---|---|---|---|---|---|---|---|
| Index | 0 | 1 | 2 | 3 | 4 | 5 | 6 |
| Obtaining process | 0 | 1 | 2 | 3 | 4 | 5 | 6 |

For example, the obtaining process 1 includes: all parameters are set to preset values; and the obtaining process 2 includes: a first parameter is set to a preset value, a second parameter is obtained by parsing the metadata, and a third parameter is obtained through calculation based on the information about the source image signal that is carried in the metadata, and the information about the display device.

S503. Optionally, determine an action interval to which the preset dynamic range conversion model is applied.

It should be understood that, in some embodiments, a dynamic range conversion model is applicable to pixels in all primary color value ranges. In some other embodiments, a dynamic range conversion model is applicable to pixels in only some primary color value ranges. Therefore, first, action intervals to which different dynamic range conversion models are applicable need to be determined, and a dynamic range conversion model is selected based on an action interval within which a to-be-processed pixel falls, to perform conversion. The determining of the action interval of the dynamic range conversion model in this embodiment of this application is not limited in this application.

S504. Obtain a primary color component of a to-be-processed pixel.

The to-be-processed pixel is obtained from the received source image signal data. It is assumed that the to-be-processed pixel satisfies the action interval of the dynamic range conversion model in this embodiment of this application.

It is assumed that the to-be-processed pixel is in an RGB color domain, and a value of one of R, G, and B components is obtained. In a feasible implementation, a value of a component with a maximum value in the R, G, and B components is obtained, and it is assumed that the value is denoted as Fmax.

S505. Convert a first value of the primary color component into a second value based on the preset dynamic range conversion model.

The dynamic range conversion model is as follows:

$$L' = F(L) = a \times \left( \frac{p \times L^n}{(k_1 \times p - k_2) \times L^n + k_3} \right)^m + b,$$

where

L is the first value, that is, Fmax obtained in step S504, L' is the second value, and $k_1, k_2, k_3, a, b, m, n$, and p are model parameters.

For example, a method of obtaining each model parameter may include the following cases:

In a feasible implementation, at least one of $k_1, k_2, k_3, a, b, m, n$, and p is obtained by obtaining, through decoding, the value that is of the model parameter and that is carried in the metadata. For example, values of all the model parameters are determined by the HDR production end, and the values are directly edited into the metadata and transmitted to the HDR display end.

In another feasible implementation, values of some parameters are determined based on preset values.

For example, at least one of $k_1, k_2$, and $k_3$ may be set to 1.

For example, m is a rational number greater than 0 and less than or equal to 8 ($0<m\leq 8$). Specifically, m may be set to 2.4.

For example, n is a rational number greater than 0 and less than or equal to 8 ($0<n\leq 8$). Specifically, n may be set to 1.

For example, m is set to 2.4 and n is set to 1; or m is set to 1 and n is set to $5/12$ (for example, n is expressed to one decimal place, that is, 0.4).

In another feasible implementation, values of some parameters are obtained directly or through calculation based on the information that is about the source image signal and that is carried in the metadata, and/or the information about the display device.

For example, b may be a minimum luminance value that is of the display device and that is obtained after normalization processing.

For example, $k_3$ may be a maximum luminance value that is of the pixels in the to-be-processed frame of the source image signal and that is obtained after normalization processing.

For example, the normalization processing includes a process of converting a to-be-normalized signal into a non-linear PQ signal value according to a process specified in the ST 2084 or 2014-SMPTE standard (in some embodiments, a PQ(x) function is used to indicate that the normalization processing is performed on x), or a process of converting a to-be-normalized signal into a non-linear HLG signal value according to a process specified in the Rec. 2100-ITU standard (in some embodiments, an HLG(x) function is used to indicate that the normalization processing is performed on x).

The maximum luminance value of the pixels in the to-be-processed frame of the source image signal may be a maximum value in luminance components of the pixels in the to-be-processed frame. For pixels in YUV color space, the maximum luminance value is a maximum value in Y components. For pixels in RGB color space, a luminance value may be obtained through calculation by using R, G, and B values. Alternatively, the maximum luminance value may be a maximum value in maximum primary color components of the pixels in the to-be-processed frame, where the maximum primary color component is a primary color component with a maximum value in a plurality of primary color components of one pixel, for example, a component with a maximum value in R, G, and B.

It should be understood that a method of obtaining a luminance component in the minimum luminance value or the average luminance value of the pixels in the to-be-processed frame of the source image signal in the following is the same as the method of obtaining the luminance component in the maximum luminance value, and details are not described again.

For example, at least one of $k_1, k_2, k_3, a, b, m, n$, and p is obtained through calculation based on the information about the source image signal and/or the information about the display device.

In some feasible implementations, the method further includes: obtaining, through decoding, the maximum luminance value of the pixels in the to-be-processed frame of the source image signal from the metadata; and before calculating a model parameter by using the maximum luminance value of the pixels in the to-be-processed frame of the source image signal, correcting the maximum luminance value of the pixels in the to-be-processed frame of the source image signal; and correspondingly, that at least one of $k_1$, $k_2$, $k_3$, a, b, m, n, and p is obtained through calculation based on the information about the source image signal and/or the information about the display device includes: at least one of $k_1$, $k_2$, $k_3$, a, b, m, n, and p is obtained based on a corrected value of the maximum luminance value of the pixels in the to-be-processed frame of the source image signal.

In an embodiment, it is assumed that in this embodiment, corresponding to a value of tone_mapping_mode, a process of obtaining a value of each model parameter includes the following:
(1) $k_1$, $k_2$, $k_3$, m, and n are respectively set to preset values 1, 1, 1, 2.4, and 1.
(2) b is the minimum luminance value that is of the display device and that is obtained after the normalization processing, that is, PQ(MinDisplay).
(3) p is obtained according to the following formula:

$$p = \begin{cases} p_{valueH} & avgL > TPH \\ p_{valueH} \times g\left(\frac{avgL - TPL}{TPH - TPL}\right) + p_{valueL} \times \left(1 - g\left(\frac{avgL - TPL}{TPH - TPL}\right)\right) & avgL \geq TPL, avgL \leq TPH, \\ p_{valueL} & avgL < TPL \end{cases}$$

where avgL is an average luminance value that is of the pixels in the to-be-processed frame of the source image signal and that is obtained after normalization processing, TPH, TPL, $p_{valueH}$, and $p_{valueL}$ are all preset values, $0 \leq TPL, TPH \leq 1$, and go is a monotonically increasing function in an interval from 0 to 1.

For example, TPL is 0.5, TPH is 0.8, $p_{valueL}$ is 3.5, $p_{valueH}$ is 5.0, and g(x)=x, where x is a rational number in the interval from 0 to 1.

The information about the source image signal includes the average luminance value of the pixels in the to-be-processed frame of the source image signal, that is, avgL may be obtained by decoding the metadata.

In a feasible implementation, the average luminance value of the pixels in the to-be-processed frame of the source image signal includes: an average value of the luminance components of the pixels in the to-be-processed frame; or an average value of the maximum primary color components of the pixels in the to-be-processed frame.

(4) a is obtained according to the following formula:

a=(MaxDisplay−MinDisplay)/(H(MaxSource)−H(MinSource)), where

MaxSource is the maximum luminance value that is of the pixels in the to-be-processed frame of the source image signal and that is obtained after the normalization processing, MinSource is a minimum luminance value that is of the pixels in the to-be-processed frame of the source image signal and that is obtained after normalization processing, MaxDisplay is a maximum luminance value that is of the display device and that is obtained after normalization processing, MinDisplay is the minimum luminance value that is of the display device and that is obtained after the normalization processing, and $$H(L) = \left(\frac{p \times L^n}{(k_1 \times p - k_2) \times L^n + k_3}\right)^m.$$

The information about the source image signal includes the maximum luminance value of the pixels in the to-be-processed frame of the source image signal and the minimum luminance value of the pixels in the to-be-processed frame of the source image signal, that is, MaxSource and MinSource may be obtained by decoding the metadata.

It should be understood that, in some feasible implementations, MaxSource is the corrected value of the maximum luminance value that is of the pixels in the to-be-processed frame of the source image signal and that is obtained after the normalization processing.

In a feasible implementation, the minimum luminance value of the pixels in the to-be-processed frame of the source image signal includes: a minimum value in the luminance components of the pixels in the to-be-processed frame; or a minimum value in the maximum primary color components of the pixels in the to-be-processed frame.

It should be understood that, according to different normalization standards, the maximum luminance value that is of the pixels in the to-be-processed frame of the source image signal and that is obtained after the normalization processing is also referred to as a maximum luminance value of the pixels in the to-be-processed frame of the source image signal in a PQ domain or a maximum luminance value of the pixels in the to-be-processed frame of the source image signal in an HLG domain. A physical quantity obtained after normalization processing also satisfies the same case, and details are not described below again.

In another embodiment, it is assumed that in this embodiment, corresponding to another value of tone_mapping_mode, a process of obtaining a value of each model parameter includes the following:
(1) $k_1$, $k_2$, and $k_3$ are respectively set to preset values 1, 1, and 1.
(2) b is the minimum luminance value that is of the display device and that is obtained after the normalization processing.
(3) When n is set to a preset value 1, a, m, and p are obtained by solving the following system of equations:

$$\begin{cases} a \times \left(\frac{p \times L1}{(p-1) \times L1 + 1}\right)^m + b = F1 \\ a \times \left(\frac{p \times L2}{(p-1) \times L2 + 1}\right)^m + b = F2, \\ a \times \left(\frac{p \times L3}{(p-1) \times L3 + 1}\right)^m + b = F3 \end{cases}$$

where

F1 is a value that is of 1 nit and that is obtained after normalization processing, F2 is a mapped value that is of the source image signal to the display device and that is obtained after normalization processing, F3 is the maximum luminance value that is of the display device and that is obtained after the normalization processing, L1 is a perceived luminance value that is of the source image signal and that is obtained after normalization processing, L2 is the average luminance value that is of the pixels in the to-be-processed frame of the source image signal and that is obtained after the normalization processing, and L3 is the maximum luminance value that is of the pixels in the to-be-processed frame of the source image signal and that is obtained after the normalization processing (in some embodiments, L3 is MaxSource). The mapped value is obtained according to the following formula:

$$y(i) = \frac{\sum_{i=0}^{N_{frame}} q(i)}{N_{frame}}, \text{ where}$$

$$q(i) = \begin{cases} \text{MaxDisplay} & LR \times f(i) \geq \text{MaxDisplay} \\ \text{MinDisplay} & LR \times f(i) \leq \text{MinDisplay} \\ LR \times f(i) & \text{otherwise} \end{cases}$$

where y(i) is the mapped value, f(i) is a maximum luminance value of an $i^{th}$ pixel in the pixels in the to-be-processed frame of the source image signal, MaxDisplay and MinDisplay are the maximum luminance value and the minimum luminance value of the display device, $N_{frame}$ is a number of pixels in the to-be-processed frame, LR is a perceived luminance compensation factor, and 0<LR≤2. For example, LR may be 0.8, 1, or 1.2.

The perceived luminance value satisfies: J(Lp)−J(1 nit)= (J(L0)−J(1 nit))*Rate, where Lp is the perceived luminance value, L0 is a preset luminance value, Rate is a preset rate, and J(x) is a proportion of pixels whose luminance is less than x nits in the to-be-processed frame of the source image signal. That is, Rate is a proportion value of a normalized number of pixels between 1 nit and Lp in the source image signal to a number of pixels between 1 nit and L0. For example, the preset luminance value is 5 nits, and the preset rate is 10%, 20%, or 30%. J(x) may be obtained by collecting statistics on a cumulative histogram of the pixels in the to-be-processed frame of the source image signal.

In another feasible implementation, the perceived luminance value is obtained by decoding the metadata.

It should be understood that, in some feasible implementations, L3 is the corrected value of the maximum luminance value that is of the pixels in the to-be-processed frame of the source image signal and that is obtained after the normalization processing.

When m is set to a preset value 2.4, a, n, and p are obtained by solving the following system of equations:

$$\begin{cases} a \times \left(\frac{p \times L1^n}{(p-1) \times L1^n + 1}\right)^{2.4} + b = F1 \\ a \times \left(\frac{p \times L2^n}{(p-1) \times L2^n + 1}\right)^{2.4} + b = F2 \\ a \times \left(\frac{p \times L3^n}{(p-1) \times L3^n + 1}\right)^{2.4} + b = F3 \end{cases}$$

Further, for example, n is set to a preset value 1. It should be understood that, when any to-be-determined parameter in a, m, and p is learned in another manner, values of the other two unknown parameters may be obtained by solving only any two equations in the system of equations.

Specifically, in an embodiment, it is assumed that m is set to a preset value 2.4, and therefore a and p are obtained by solving the following system of equations:

$$\begin{cases} a \times \left(\frac{p \times L3}{(p-1) \times L3 + 1}\right)^{2.4} + b = F3 \\ a \times \left(\frac{p \times LM}{(p-1) \times LM + 1}\right)^{2.4} + b = FM \end{cases}, \text{ where}$$

$LM = L2$ and $FM = F2$, or $LM = L1$ and $FM = F1$.

In another embodiment, when L2 is less than a normalized preset luminance value, LM=L1 and FM=F1; or when L2 is greater than or equal to the normalized preset luminance value, LM=L2 and FM=F2. For example, the preset luminance value may be 2 nits, 5 nits, or the like.

In a third embodiment, it is assumed that in this embodiment, corresponding to a third value of tone_mapping_mode, a process of obtaining a value of each model parameter includes the following:

(1) $k_1$, $k_2$, m, and n are respectively set to preset values 1, 1, 2.4, and 1.

(2) b is the minimum luminance value that is of the display device and that is obtained after the normalization processing.

(3) $k_3$ is the maximum luminance value that is of the pixels in the to-be-processed frame of the source image signal and that is obtained after the normalization processing. For example, for RGB color space, $k_3$ is a maximum value that is in maximum primary color component values of the pixels in the to-be-processed frame of the source image signal and that is obtained after normalization processing.

It should be understood that, in some feasible implementations, $k_3$ is the corrected value of the maximum luminance value that is of the pixels in the to-be-processed frame of the source image signal and that is obtained after the normalization processing.

(4) a is a difference between the maximum luminance value that is of the display device and that is obtained after the normalization processing and the minimum luminance value that is of the display device and that is obtained after the normalization processing.

(5) p is obtained according to the following formula: p=c*v+d, where c and d are preset values. For example, c is 7, d is 3, and v is obtained according to the following formula: v=J(Tq)−J(Tp), where J(x) is the proportion of the pixels whose luminance is less than x nits in the to-be-processed frame of the source image signal, Tp is the value that is of 1 nit and that is obtained after the normalization processing, and Tq is Tp multiplied by a ratio of the maximum luminance value that is of the pixels in the to-be-processed frame of the source image signal and that is obtained after the normalization processing to the maximum value that is of the display device and that is obtained after the normalization processing. J(x) may be obtained by collecting statistics on a cumulative histogram of the pixels in the to-be-processed frame of the source image signal. In some feasible implementations, c and d may also be determined based on the information about the source image signal and/or the information about the display device, such as the maximum luminance value of the display device, or a luminance range and distribution of the source image signal.

In another implementation of this embodiment, v may be alternatively calculated in a different manner. Details are as follows:

In this embodiment, $k_3 = E_{src\_max}$.

$E_{src\_max}$ is determined by using the following method:

$$E_{src\_max} = \max(E_{disp\_max}, \text{prctile}(x)), \text{ where}$$

prctile(x) represents a value at x percent of the maximum primary color component values of the pixels in the to-be-processed frame of the source image signal. prctile(x) is included in the dynamic metadata, for example, prctile(100), prctile(99), or prctile(95). prctile(x) is set to prctile(100) by default. Herein, a smaller value of x indicates larger output image luminance. Therefore, if luminance needs to be increased, prctile(x) may be set to prctile(99) or prctile(95). The maximum luminance value ($E_{disp\_max}$) is a lower limit of a value of $E_{src\_max}$. This means that for a source image signal whose maximum luminance is lower than a maximum luminance value of a display device, tone mapping keeps the maximum luminance of the source image signal.

p may be determined by using histogram information in the metadata, and a principle is that p is determined based on a tone loss caused by tone mapping. A theoretical basis of this method is a limitation of a human eye for contrast perception. When luminance of an area of an image is lower than a light adaptation threshold Tp (approximately between 1 nit and 5 nits), it is very difficult for the human eye to see contrast information of the area. The light adaptation threshold varies from person to person. To simplify the solution, in this embodiment of this application, Tp is set to 1 nit by default, that is, it is assumed that the human eye can effectively perceive an image area whose luminance is higher than 1 nit, and contrast perception of the human eye for an area whose luminance is lower than 1 nit obviously decreases.

If luminance of a specific proportion of pixels in a histogram of an image is at least 1 nit before tone mapping and falls below 1 nit after the tone mapping, this proportion is a tone loss proportion. Statistics are collected on a histogram of the image in a PQ domain. Before p is determined, a dynamic range conversion curve cannot be determined. Therefore, it is assumed that corresponding linear mapping of $E_{src\_max}$ to $E_{disp\_max}$ approximates to tone mapping, to estimate a tone loss caused by the tone mapping. Approximate tone mapping is as follows:

$$L_{out} = L_{in} \frac{E_{dispmax}}{E_{src\_max}},$$

where $L_{in}$ is an input value, $L_{out}$ is an output value, and both are values in the PQ domain. The tone loss v is calculated by using the following formula:

$$v = J(L_{out} = 0.15) - J(L_{in} = 0.15), \text{ where}$$

0.15 is a PQ domain luminance value corresponding to 1 nit (that is, a value that is of 1 nit and that is obtained after normalization processing), $J(L_{out} = 0.15)$ represents a proportion of pixels whose luminance is lower than 1 nit after approximate tone mapping is performed, and $J(L_{in} = 0.15)$ represents a proportion of pixels whose luminance is lower than 1 nit in the to-be-processed frame of the source image signal. It should be understood that a cumulative histogram J is normalized, that is, satisfies: $J(E_{src\_max}) = 1$. When the tone loss v increases, the parameter p accordingly increases.

Figure 6:
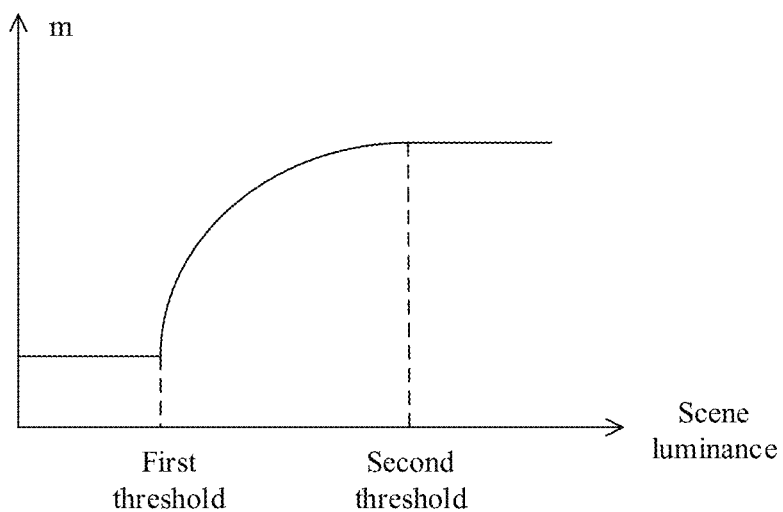
FIG. 6 is a schematic diagram of a relationship between image scene luminance and a parameter m according to an embodiment of this application.
Figure 7:
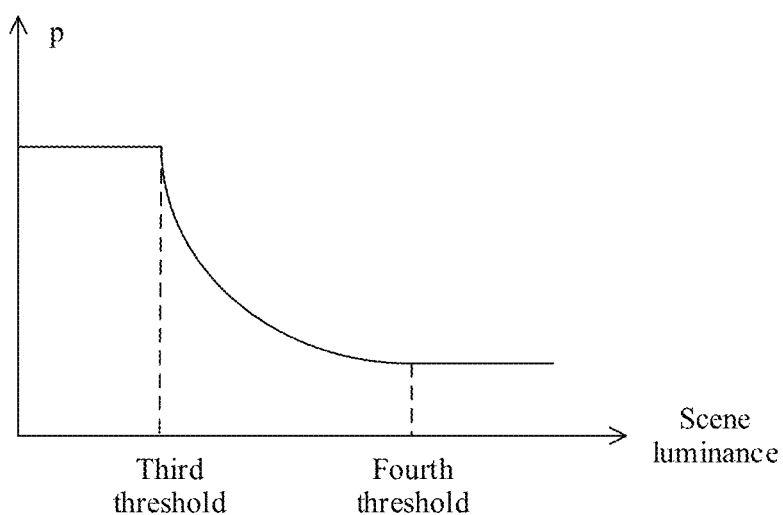
FIG. 7 is a schematic diagram of a relationship between image scene luminance and a parameter p according to an embodiment of this application.

It should be understood that in some other feasible embodiments, the model parameter may be dynamically determined. For example, values of p, n, and m may be determined by determining image scene luminance. FIG. 6 shows a relationship between image scene luminance and a parameter m. Within a first scene luminance range, m is in direct proportion to the scene luminance, and larger scene luminance indicates a larger value of m. It is assumed that an upper bound of the first scene luminance range is a first threshold, and a lower bound of the first scene luminance range is a second threshold. When the scene luminance exceeds the first scene luminance range, a value of m is limited to a value that is of m and that is corresponding to the first threshold or the second threshold. FIG. 7 shows a relationship between image scene luminance and a parameter p. Within a second scene luminance range, p is in inverse proportion to the scene luminance, and larger scene luminance indicates a smaller value of p. It is assumed that an upper bound of the second scene luminance range is a third threshold, and a lower bound of the second scene luminance range is a fourth threshold. When the scene luminance exceeds the second scene luminance range, a value of p is limited to a value that is of p and that is corresponding to the third threshold or the fourth threshold. n is determined based on luminance distribution in a luminance histogram of the scene luminance. Specifically, the luminance histogram may be produced based on the scene luminance. When more scene luminance values are distributed in two end areas (a bright area and a dark area) of the luminance distribution, and fewer scene luminance values are distributed in a middle area of the luminance distribution, a value of n approximates to 1. For example, after p, n, and m are determined, the parameters a and b may be calculated based on a maximum display capability of the display device, a minimum display capability of the display device, and a scene color range (or a mapped value of the scene color range) corresponding to a to-be-processed color signal. A display capability of the display device may be obtained based on a parameter of the display device or information of a manufacturer. The maximum display capability of the display device may approximately have several grades: 570 nits, 800 nits, and 1000 nits. The minimum display capability of the display device is usually 0 nits, or may be 1 nit. The scene color range, including a color maximum value and a color minimum value of a scene, may be carried in the dynamic metadata. The color maximum value may be a maximum value in R, G, and B components. A proportion value of the maximum value (for example, 90% of the maximum value) may also be determined based on a weighted value (for example, an average value) of R, G, and B. The color minimum value may be 0, or may be determined based on the weighted value of R, G, and B.

After the parameters of the dynamic range conversion model are determined, conversion of the first value into the second value may be completed based on the dynamic range conversion model.

In a feasible implementation, all primary color components of the to-be-processed pixel may be converted by using the method in step S505. In another feasible implementation, only a primary color component with a maximum value in three primary color components of the to-be-processed pixel may be converted, and a rate of a denormalized second value to a denormalized first value is calculated. It is assumed that the rate is K. A value that is K times a denormalized value of each primary color component of the to-be-processed pixel is used as a converted value.

S506. Display a converted image signal on the display device.

It should be understood that, after the converted image signal is obtained and before the image signal is displayed, one or more image processing processes such as saturation adjustment, color gamut conversion, denoising processing, and sharpening processing may be further performed on the converted image signal. This is not limited in this embodiment of this application.

It should be understood that, in this embodiment of this application, the parameter n is introduced into the dynamic range conversion model, and the parameter n may reflect a feature of luminance distribution in a scene corresponding to the to-be-processed color signal. This provides greater flexibility for adaptation between the dynamic range conversion model and the scene. When the other model parameters are properly configured, image content in different dynamic ranges is converted, so that a better display effect can be achieved.

Figure 8:
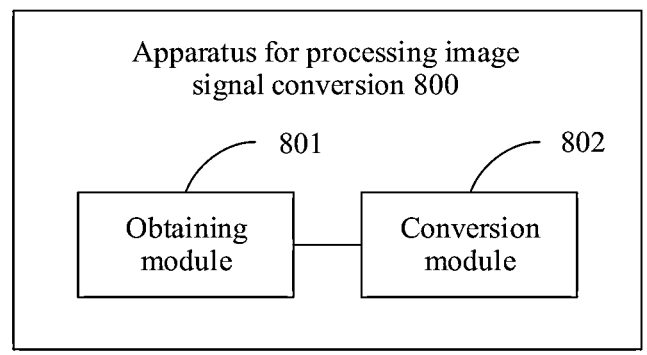
FIG. 8 is a schematic diagram of a structure of an apparatus for processing image signal conversion according to an embodiment of this application.

FIG. 8 is a schematic diagram of a structure of an apparatus for processing image signal conversion according to an embodiment of this application. The apparatus for processing image signal conversion provided in this embodiment of the present invention may be configured to implement some or all procedures in the embodiment of the method for processing image signal conversion described with reference to FIG. 2A and FIG. 2B, FIG. 3, or FIG. 5 in the present invention. An apparatus 800 for processing image signal conversion shown in FIG. 8 includes: an obtaining module 801, configured to obtain a primary color component of a to-be-processed pixel; and a conversion module 802, configured to convert a first value of the primary color component into a second value based on a preset dynamic range conversion model, where the dynamic range conversion model is as follows:

$$L' = F(L) = a \times \left(\frac{p \times L^n}{(k_1 \times p - k_2) \times L^n + k_3}\right)^m + b,$$

where

L is the first value, L' is the second value, and $k_1$, $k_2$, $k_3$, a, b, m, n, and p are model parameters.

In a feasible implementation, before the converting a first value of the primary color component into a second value based on a preset dynamic range conversion model, the obtaining module 801 is further configured to determine a method of obtaining the model parameter based on identifier information carried in metadata, where the metadata includes static metadata and/or dynamic metadata.

In a feasible implementation, the metadata and the to-be-processed pixel are obtained by decoding a bitstream related to a source image signal.

In a feasible implementation, the method of obtaining the model parameter includes: obtaining, through decoding, a value that is of the model parameter and that is carried in the metadata; using a preset value as a value of the model parameter; or obtaining a value of the model parameter through calculation based on information about the source image signal and/or information about a display device, where the information about the source image signal is obtained by decoding the metadata.

In a feasible implementation, at least one of $k_1$, $k_2$, $k_3$, a, b, m, n, and p is obtained by obtaining, through decoding, the value that is of the model parameter and that is carried in the metadata.

In a feasible implementation, at least one of $k_1$, $k_2$, $k_3$, m, and n is obtained based on the preset value, where $0 < n \leq 8$, and $0 < m \leq 8$.

In a feasible implementation, values of the model parameters satisfy at least one of the following: m is 2.4 or 1, n is 1 or 5/12, $k_1$ is 1, $k_2$ is 1, and $k_3$ is 1.

In a feasible implementation, b is a minimum luminance value that is of the display device and that is obtained after normalization processing.

In a feasible implementation, $k_3$ is a maximum luminance value that is of pixels in a to-be-processed frame of the source image signal and that is obtained after normalization processing.

In a feasible implementation, the maximum luminance value of the pixels in the to-be-processed frame of the source image signal includes: a maximum value in luminance components of the pixels in the to-be-processed frame; or a maximum value in maximum primary color components of the pixels in the to-be-processed frame, where the maximum primary color component is a primary color component with a maximum value in a plurality of primary color components of one pixel.

In a feasible implementation, at least one of $k_1$, $k_2$, $k_3$, a, b, m, n, and p is obtained through calculation based on the information about the source image signal and/or the information about the display device.

In a feasible implementation, the information about the source image signal includes an average luminance value of the pixels in the to-be-processed frame of the source image signal, and p is obtained according to the following formula:

$$p = \begin{cases} p_{valueH} & avgL > TPH \\ p_{valueH} \times g\left(\frac{avgL - TPL}{TPH - TPL}\right) + p_{valueL} \times \left(1 - g\left(\frac{avgL - TPL}{TPH - TPL}\right)\right) & avgL \geq TPL, avgL \leq TPH, \\ p_{valueL} & avgL < TPL \end{cases}$$

where avgL is an average luminance value that is of the pixels in the to-be-processed frame of the source image signal and that is obtained after normalization processing, TPH, TPL, $p_{valueH}$, and $p_{valueL}$ are all preset values, $0 \leq TPL$, $TPH \leq 1$, and go is a monotonically increasing function in an interval from 0 to 1.

In a feasible implementation, TPL is 0.5, TPH is 0.8, $p_{valueL}$ is 3.5, $p_{valueH}$ is 5.0, and g(x)=x, where x is a rational number in the interval from 0 to 1.

In a feasible implementation, the average luminance value of the pixels in the to-be-processed frame of the source image signal includes: an average value of the luminance components of the pixels in the to-be-processed frame; or an average value of the maximum primary color components of the pixels in the to-be-processed frame.

In a feasible implementation, the information about the source image signal includes the maximum luminance value of the pixels in the to-be-processed frame of the source image signal and a minimum luminance value of the pixels in the to-be-processed frame of the source image signal, and a is obtained according to the following formula:

$$a=(MaxDisplay-MinDisplay)/(H(MaxSource)-H(MinSource)), \text{ where}$$

MaxSource is the maximum luminance value that is of the pixels in the to-be-processed frame of the source image signal and that is obtained after the normalization processing, MinSource is a minimum luminance value that is of the pixels in the to-be-processed frame of the source image signal and that is obtained after normalization processing, MaxDisplay is a maximum luminance value that is of the display device and that is obtained after normalization processing, MinDisplay is the minimum luminance value that is of the display device and that is obtained after the normalization processing, and $$H(L) = \left(\frac{p \times L^n}{(k_1 \times p - k_2) \times L^n + k_3}\right)^m.$$

In a feasible implementation, the minimum luminance value of the pixels in the to-be-processed frame of the source image signal includes: a minimum value in the luminance components of the pixels in the to-be-processed frame; or a minimum value in the maximum primary color components of the pixels in the to-be-processed frame.

In a feasible implementation, a, p, and m are obtained by solving the following system of equations:

$$\begin{cases} a \times \left(\frac{p \times L1}{(p-1) \times L1 + 1}\right)^m + b = F1 \\ a \times \left(\frac{p \times L2}{(p-1) \times L2 + 1}\right)^m + b = F2, \\ a \times \left(\frac{p \times L3}{(p-1) \times L3 + 1}\right)^m + b = F3 \end{cases}$$

where

F1 is a value that is of 1 nit and that is obtained after normalization processing, F2 is a mapped value that is of the source image signal to the display device and that is obtained after normalization processing, F3 is the maximum luminance value that is of the display device and that is obtained after the normalization processing, L1 is a perceived luminance value that is of the source image signal and that is obtained after normalization processing, L2 is the average luminance value that is of the pixels in the to-be-processed frame of the source image signal and that is obtained after the normalization processing, and L3 is the maximum luminance value that is of the pixels in the to-be-processed frame of the source image signal and that is obtained after the normalization processing.

In a feasible implementation, a and p are obtained by solving the following system of equation $$\begin{cases} a \times \left(\frac{p \times M1}{(p-1) \times M1 + 1}\right)^m + b = N1 \\ a \times \left(\frac{p \times L3}{(p-1) \times L3 + 1}\right)^m + b = F3 \end{cases},$$

where

F1 is the value that is of 1 nit and that is obtained after the normalization processing, F2 is the mapped value that is of the source image signal to the display device and that is obtained after the normalization processing, F3 is the maximum luminance value that is of the display device and that is obtained after the normalization processing, L1 is the perceived luminance value that is of the source image signal and that is obtained after the normalization processing, L2 is the average luminance value that is of the pixels in the to-be-processed frame of the source image signal and that is obtained after the normalization processing, and L3 is the maximum luminance value that is of the pixels in the to-be-processed frame of the source image signal and that is obtained after the normalization processing; and when L2 is less than a value that is of 5 nits and that is obtained after normalization processing, M1 is equal to L1 and N1 is equal to F1; or when L2 is greater than or equal to the value that is of 5 nits and that is obtained after the normalization processing, M1 is equal to L2 and N1 is equal to F2.

In a feasible implementation, the mapped value is obtained according to the following formula:

$$y(i) = \frac{\sum_{i=0}^{N_{frame}} q(i)}{N_{frame}}, \text{ where}$$

$$q(i) = \begin{cases} \text{MaxDisplay} & LR \times f(i) \geq \text{MaxDisplay} \\ \text{MinDisplay} & LR \times f(i) \leq \text{MinDisplay}, \\ LR \times f(i) & \text{otherwise} \end{cases}$$

where y(i) is the mapped value, f(i) is a maximum luminance value of an $i^{th}$ pixel in the pixels in the to-be-processed frame of the source image signal, MaxDisplay and MinDisplay are the maximum luminance value and the minimum luminance value of the display device, $N_{frame}$ is a number of pixels in the to-be-processed frame, LR is a perceived luminance compensation factor, and 0<LR≤2.

In a feasible implementation, LR is 0.8, 1, or 1.2.

In a feasible implementation, the perceived luminance value satisfies: J(Lp)−J(1 nit)=(J(L0)−J(1 nit))*Rate, where Lp is the perceived luminance value, L0 is a preset luminance value, Rate is a preset rate, and J(x) is a proportion of pixels whose luminance is less than x nits in the to-be-processed frame of the source image signal.

In a feasible implementation, the preset luminance value is 5 nits, and the preset rate is 10%, 20%, or 30%.

In a feasible implementation, the perceived luminance value is obtained by decoding the metadata.

In a feasible implementation, a is a difference between the maximum luminance value that is of the display device and that is obtained after the normalization processing and the minimum luminance value that is of the display device and that is obtained after the normalization processing.

In a feasible implementation, p is obtained according to the following formula: p=c*v+d, where c and d are preset values.

In a feasible implementation, c is 7, and d is 3.

In a feasible implementation, v is obtained according to the following formula: v=J(Tq)−J(Tp), where J(x) is the proportion of the pixels whose luminance is less than x nits in the to-be-processed frame of the source image signal, Tp is the value that is of 1 nit and that is obtained after the normalization processing, and Tq is Tp multiplied by a ratio of the maximum luminance value that is of the pixels in the to-be-processed frame of the source image signal and that is obtained after the normalization processing to the maximum value that is of the display device and that is obtained after the normalization processing.

In a feasible implementation, the normalization processing includes: a process of converting a to-be-normalized signal into a non-linear PQ signal value according to a process specified in the ST 2084 or 2014-SMPTE standard, or a process of converting a to-be-normalized signal into a non-linear HLG signal value according to a process specified in the Rec. 2100-ITU standard.

In a feasible implementation, the obtaining module 801 is further configured to: obtain, through decoding, the maximum luminance value of the pixels in the to-be-processed frame of the source image signal from the metadata; and correct the maximum luminance value of the pixels in the to-be-processed frame of the source image signal; and correspondingly, that at least one of $k_1$, $k_2$, $k_3$, a, b, m, n, and p is obtained through calculation based on the information about the source image signal and/or the information about the display device includes: at least one of $k_1$, $k_2$, $k_3$, a, b, m, n, and p is obtained based on a corrected value of the maximum luminance value of the pixels in the to-be-processed frame of the source image signal.

Figure 9:
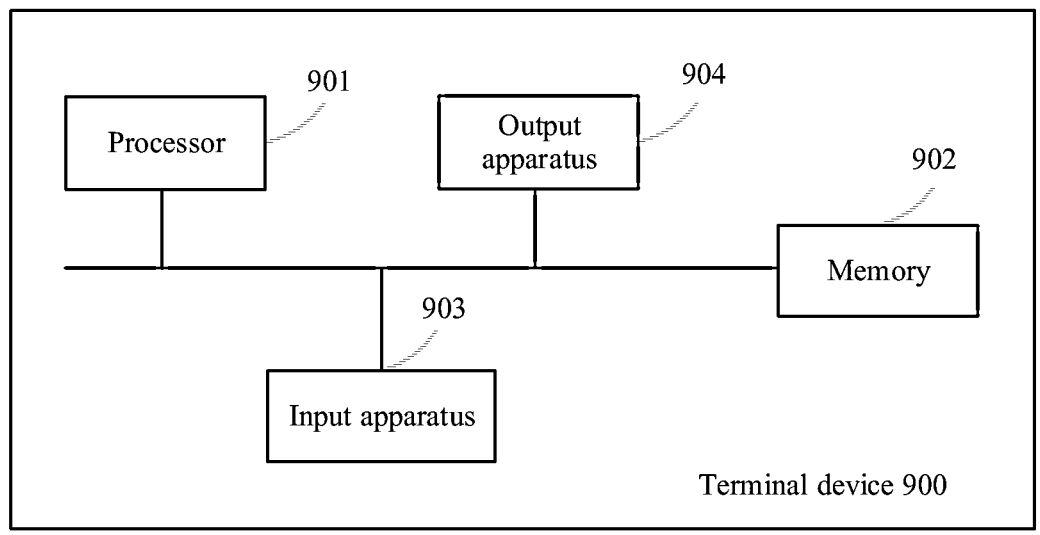
FIG. 9 is a schematic diagram of a structure of a terminal device according to an embodiment of this application.

FIG. 9 is a schematic diagram of a structure of a terminal device according to an embodiment of this application. As shown in FIG. 9, a terminal device 900 may include a processor 901, a memory 902, an input apparatus 903, and an output apparatus 904. The processor 901 is connected to the memory 902, the input apparatus 903, and the output apparatus 904. For example, the processor 901 may be connected to the memory 902, the input apparatus 903, and the output apparatus 904 by using a bus.

The processor 901 may be a central processing unit (CPU), a network processor (NP), or the like.

The memory 402 may include a volatile memory, for example, a random access memory (RAM); or the memory may include a non-volatile memory, for example, a read-only memory (ROM), a flash memory, a hard disk drive (HDD), or a solid-state drive (SSD); or the memory may include a combination of memories of the foregoing types.

The processor 901 is configured to perform some or all procedures in the embodiment of the method for processing image signal conversion described in FIG. 2A and FIG. 2B, FIG. 3, or FIG. 5 in the present invention.

In the descriptions of this specification, reference terms "an embodiment", "some embodiments", "an example", "a specific example", "some examples", or the like mean that the specific features, structures, materials, or characteristics described with reference to the embodiments or examples are included in at least one embodiment or example of the present invention. In the specification, the foregoing illustrative expressions of the terms are not necessarily with respect to a same embodiment or example. In addition, the described specific features, structures, materials, or characteristics may be combined in an appropriate manner in any one or more of the embodiments or examples. In addition, a person skilled in the art may integrate or combine different embodiments or examples and characteristics of different embodiments or examples described in the specification, as long as they do not conflict each other.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include at least one of the features. In the descriptions of the present invention, "a plurality of" means at least two, such as two or three, unless there is a specific limitation.

Logic and/or steps shown in the flowcharts or described herein in other manners, for example, may be considered as a program list of executable instructions that are used to implement logic functions, and may be specifically implemented on any computer-readable medium, for an instruction execution system, apparatus, or device (for example, a computer-based system, a system including a processor, or another system that can fetch instructions from the instruction execution system, apparatus, or device and execute the instructions) to use, or for use in combination with the instruction execution system, apparatus, or device. In terms of the specification, the "computer-readable medium" may be any apparatus that may include, store, communicate, propagate, or transmit programs, for the instruction execution system, apparatus, or device to use, or for use in combination with the instruction execution system, apparatus, or device. More specific examples (this list is not exhaustive) of the computer-readable medium include the following: an electrical connection portion (an electronic apparatus) with one or more buses, a portable computer cartridge (a magnetic apparatus), a random access memory, a read-only memory, an erasable programmable read-only memory, an optical fiber apparatus, and a compact disc read-only memory. In addition, the computer-readable medium may even be a piece of paper on which the programs can be printed or another appropriate medium. For example, optical scanning may be performed on the paper or the another medium, then processing, such as edition, decoding, or another appropriate means when necessary, may be performed to obtain the programs in an electrical manner, and then the programs are stored in a computer memory.

It should be understood that, parts in the present invention may be implemented by using hardware, software, firmware, or a combination thereof. In the foregoing implementations, a plurality of steps or methods may be implemented by using software or firmware that is stored in a memory and is executed by an appropriate instruction execution system. For example, if hardware is used for implementation, similar to another implementation, any one or a combination of the following well-known technologies in the art may be used for implementation: a discrete logic circuit having a logic gate circuit that is used to implement a logic function for a data signal, an application-specific integrated circuit having an appropriate combinatorial logic gate circuit, a programmable gate array, a field programmable gate array, and the like.

In addition, the modules in embodiments of the present invention may be implemented in a form of hardware, or may be implemented in a form of a software functional module. If an integrated module is implemented in a form of a software functional module and sold or used as an independent product, the integrated module may be stored in a computer-readable storage medium.

Although embodiments of the present invention are shown and described above, it can be understood that, the foregoing embodiments are examples, and cannot be construed as a limitation to the present invention. Within the scope of the present invention, a person of ordinary skill in the art may make changes, modifications, replacement, and variations to the foregoing embodiments.

The invention claimed is:

1. A method for processing image signal conversion, the method comprising:

obtaining a primary color component of a to-be-processed pixel; and converting a first value of the primary color component into a second value based on a preset dynamic range conversion model, wherein the dynamic range conversion model is:

$$L' = F(L) = a \times \left( \frac{p \times L^n}{(k_1 \times p - k_2) \times L^n + k_3} \right)^m + b,$$

wherein

L is the first value, L is the second value, and $k_1$, $k_2$, $k_3$, a, b, m, n, and p are model parameters, wherein information about a source image signal comprises an average luminance value of pixels in a to-be-processed frame of the source image signal, and p is obtained according to the following formula:

$$p = \begin{cases} p_{valueH} & avgL > TPH \\ p_{valueH} \times g\left(\frac{avgL - TPL}{TPH - TPL}\right) + p_{valueL} \times \left(1 - g\left(\frac{avgL - TPL}{TPH - TPL}\right)\right) & avgL \geq TPL, avgL \leq TPH, \\ p_{valueL} & avgL < TPL \end{cases}$$

wherein avgL is an average luminance value of the pixels in the to-be-processed frame of the source image signal that is obtained after normalization processing, TPH, TPL, $p_{valueH}$, and $p_{valueL}$ are all preset values, $0 \leq TPL$, $TPH \leq 1$, and g() is a monotonically increasing function in an interval from 0 to 1.

2. The method according to claim 1, wherein the metadata and the to-be-processed pixel are obtained by decoding a bitstream related to the source image signal.

3. The method according to claim 2, wherein before converting the first value of the primary color component into the second value, the method further comprises selecting a method from a plurality of methods of obtaining the model parameter based on identifier information carried in metadata, wherein the metadata comprises static metadata and/or dynamic metadata, and the plurality of methods of obtaining the model parameter comprises:
   obtaining, through decoding, a value of the model parameter that is carried in the metadata;
   using a preset value as the value of the model parameter; and
   obtaining the value of the model parameter through a calculation based on information about the source image signal and/or information about a display device, wherein the information about the source image signal is obtained by decoding the metadata.

4. The method according to claim 1, wherein b is a minimum luminance value of the display device that is obtained after normalization processing.

5. The method according to claim 1, wherein $k_3$ is a maximum luminance value of pixels in a to-be-processed frame of the source image signal that is obtained after normalization processing.

6. The method according to claim 5, wherein the maximum luminance value of the pixels in the to-be-processed frame of the source image signal comprises:
   a maximum value in luminance components of the pixels in the to-be-processed frame; or
   a maximum value in maximum primary color components of the pixels in the to-be-processed frame, wherein the maximum primary color component is a primary color component with a maximum value in a plurality of primary color components of one pixel.

7. The method according to claim 1, wherein at least one of $k_1$, $k_2$, $k_3$, a, b, m, n, and p is obtained, through decoding the value of the model parameter that is carried in the metadata.

8. The method according to claim 1, wherein at least one of $k_1$, $k_2$, $k_3$, m, and n is obtained based on a preset value, wherein $0 < n \leq 8$, and $0 < m \leq 8$.

9. The method according to claim 1, wherein: m is 2.4 or 1, n is 1 or 5/12, $k_1$ is 1, $k_2$ is 1, and $k_3$ is 1.

10. The method according to claim 1, wherein at least one of $k_1$, $k_2$, $k_3$, a, b, m, n, and p is obtained through a calculation based on the information about the source image signal and/or the information about the display device.

11. The method according to claim 10, wherein the information about the source image signal comprises a maximum luminance value of the pixels in the to-be-processed frame of the source image signal and a minimum luminance value of the pixels in the to-be-processed frame of the source image signal, and a is obtained according to the following formula:

$a = (MaxDisplay - MinDisplay)/(H(MaxSource) - H(MinSource))$, wherein

MaxSource is a maximum luminance value of the pixels in the to-be-processed frame of the source image signal that is obtained after normalization processing, MinSource is a minimum luminance value of the pixels in the to-be-processed frame of the source image signal that is obtained after normalization processing, MaxDisplay is a maximum luminance value of the display device that is obtained after normalization processing, MinDisplay is a minimum luminance value of the display device that is obtained after normalization processing, and $$H(L) = \left(\frac{p \times L^n}{(k_1 \times p - k_2) \times L^n + k_3}\right)^m.$$

12. The method according to claim 1, wherein TPL is 0.5, TPH is 0.8, $p_{valueL}$ is 3.5, $p_{valueH}$ is 5.0, and g(x)=x, wherein x is a rational number in the interval from 0 to 1.

13. The method according to claim 1, wherein the average luminance value of the pixels in the to-be-processed frame of the source image signal comprises:
   an average value of the luminance components of the pixels in the to-be-processed frame; or
   an average value of the maximum primary color components of the pixels in the to-be-processed frame.

14. An apparatus for processing image signal conversion, wherein the apparatus comprises:
   an obtaining module, configured to obtain a primary color component of a to-be-processed pixel; and
   a conversion module, configured to convert a first value of the primary color component into a second value based on a preset dynamic range conversion model, wherein the dynamic range conversion model is:

$$L' = F(L) = a \times \left(\frac{p \times L^n}{(k_1 \times p - k_2) \times L^n + k_3}\right)^m + b,$$

L is the first value, L' is the second value, and $k_1$, $k_2$, $k_3$, a, b, m, n, and p are model parameters, wherein information about a source image signal comprises an average luminance value of pixels in a to-be-processed frame of the source image signal, and p is obtained according to the following formula:

$$p = \begin{cases} p_{valueH} & avgL > TPH \\ p_{valueH} \times g\left(\frac{avgL - TPL}{TPH - TPL}\right) + \\ p_{valueL} \times \left(1 - g\left(\frac{avgL - TPL}{TPH - TPL}\right)\right) & avgL \geq TPL, avgL \leq TPH, \\ p_{valueL} & avgL < TPL \end{cases}$$

wherein avgL is an average luminance value of the pixels in the to-be-processed frame of the source image signal that is obtained after normalization processing, TPH, TPL, $p_{valueH}$, and $p_{valueL}$ are all preset values, 0<TPL, TPH≤1, and go is a monotonically increasing function in an interval from 0 to 1.

15. The apparatus according to claim 14, wherein the metadata and the to-be-processed pixel are obtained by decoding a bitstream related to the source image signal.

16. The apparatus according to claim 15, wherein: the obtaining module is further configured to, before converting the first value of the primary color component into the second value, select a method from a plurality of methods of obtaining the model parameter based on identifier information carried in metadata, wherein the metadata comprises static metadata and/or dynamic metadata, and the plurality of methods of obtaining the model parameter comprises:

obtaining, through decoding, a value of the model parameter that is carried in the metadata;

using a preset value as the value of the model parameter; and obtaining the value of the model parameter through a calculation based on information about the source image signal and/or information about a display device, wherein the information about the source image signal is obtained by decoding the metadata.

17. The apparatus according to claim 14, wherein at least one of $k_1$, $k_2$, $k_3$, a, b, m, n, and p is obtained by obtaining, through decoding, the value of the model parameter that is carried in the metadata.

* * * * *

UNITED STATES PATENT AND TRADEMARK OFFICE
CERTIFICATE OF CORRECTION

PATENT NO. : 12,284,350 B2  
APPLICATION NO. : 17/721561  
DATED : April 22, 2025  
INVENTOR(S) : Weiwei Xu et al.

Page 1 of 1

It is certified that error appears in the above-identified patent and that said Letters Patent is hereby corrected as shown below:

In the Claims

In Column 33, Claim 1, Line 1, delete "L" and insert -- L' --, therefor.

In Column 33, Claim 1, Line 23, delete "go" and insert -- g() --, therefor.

In Column 35, Claim 14, Line 16, delete "go" and insert -- g() --, therefor.

Signed and Sealed this  
Fifteenth Day of July, 2025

Coke Morgan Stewart  
*Acting Director of the United States Patent and Trademark Office*